(12) United States Patent
Akagi et al.

(10) Patent No.: US 8,562,857 B2
(45) Date of Patent: Oct. 22, 2013

(54) PROCESS FOR PRODUCING POSITIVE ELECTRODE ACTIVE MATERIAL PARTICLES FOR BATTERY

(75) Inventors: Ryuichi Akagi, Wakayama (JP); Yoshinobu Ishikawa, Wakayama (JP); Kenichi Nishimura, Funabashi (JP)

(73) Assignee: Kao Corporation, Tokyo (JP)

(*) Notice: Subject to any disclaimer, the term of this patent is extended or adjusted under 35 U.S.C. 154(b) by 239 days.

(21) Appl. No.: 13/125,988

(22) PCT Filed: Oct. 7, 2009

(86) PCT No.: PCT/JP2009/067511
§ 371 (c)(1),
(2), (4) Date: Apr. 26, 2011

(87) PCT Pub. No.: WO2010/050348
PCT Pub. Date: May 6, 2010

(65) Prior Publication Data
US 2011/0204301 A1     Aug. 25, 2011

(30) Foreign Application Priority Data

Oct. 27, 2008  (JP) ................................. 2008-275887
Jun. 22, 2009  (JP) ................................. 2009-148019

(51) Int. Cl.
*H01M 4/88*     (2006.01)

(52) U.S. Cl.
USPC ................ 252/182.1; 252/519.33; 423/594.4; 429/128; 429/161; 429/199; 429/231.1; 429/231.8

(58) Field of Classification Search
USPC .......... 252/182.1, 519.33; 429/128, 161, 199, 429/218.1, 231.1, 231.8; 423/594.4
See application file for complete search history.

(56) References Cited

U.S. PATENT DOCUMENTS

| 6,197,100 | B1 | 3/2001 | Melbouci |
| 2001/0019797 | A1* | 9/2001 | Kezuka et al. ................ 429/161 |
| 2005/0123832 | A1 | 6/2005 | Tsukuma et al. |

(Continued)

FOREIGN PATENT DOCUMENTS

| CN | 1329637 A | 1/2002 |
| CN | 1990144 A | 7/2007 |

(Continued)

OTHER PUBLICATIONS

Machine generated translation of JP-2002-104827-A, published Apr. 10, 2002.

(Continued)

*Primary Examiner* — Khanh Tuan Nguyen
(74) *Attorney, Agent, or Firm* — Birch, Stewart, Kolasch & Birch, LLP

(57) ABSTRACT

A process of producing positive electrode active material particles for a battery, comprising a step of providing a slurry comprising resin particles, a cationic surfactant and/or a polyvinyl alcohol derivative, lithium complex oxide particles, and a polar solvent; removing the polar solvent from the slurry to give a composition; and firing the composition and at the same time, removing the resin particles from the composition, wherein the cationic surfactant is a quaternary ammonium salt, the polyvinyl alcohol derivative is a polyvinyl alcohol into which a quaternary ammonium salt group has been introduced or which has been substituted by a quaternary ammonium salt group, and the resin particles have an average particle size of 0.1 to 20 μm.

6 Claims, 2 Drawing Sheets

(56) References Cited

U.S. PATENT DOCUMENTS

| | | | |
|---|---|---|---|
| 2006/0151318 A1 | 7/2006 | Park et al. | |
| 2009/0074957 A1 | 3/2009 | Park et al. | |
| 2010/0075222 A1* | 3/2010 | Watanabe | 429/199 |

FOREIGN PATENT DOCUMENTS

| | | | |
|---|---|---|---|
| JP | 2002-104827 A | | 4/2002 |
| JP | 2003-77465 A | | 3/2003 |
| JP | 2003-168438 | * | 6/2003 |
| JP | 2004-83388 A | | 3/2004 |
| JP | 2005-135925 A | | 5/2005 |
| JP | 2005-158401 A | | 6/2005 |
| JP | 2006-196457 A | | 7/2006 |
| WO | WO 2008/056585 | * | 5/2008 |

OTHER PUBLICATIONS

Machine generated translation of JP-2003-77465-A, published Mar. 14, 2003.
Machine generated translation of JP-2005-135925-A, published May 26, 2005.
Machine generated translation of JP-2005-158401-A, published Jun. 16, 2005.
International Preliminary Report on Patentability, and Translation of Written Opinion of the International Searching Authority, dated Jun. 16, 2011, for International Application No. PCT/JP2009/067511 (Forms PCT/IB/338, PCT/IB/373 and PCT/ISA/237).
International Search Report dated Nov. 10, 2009 for PCT/JP2009/067511.
Chinese Search Report and English Translation for Chinese Application No. 200980142803.8 dated Mar. 5, 2013.

* cited by examiner

PROCESS FOR PRODUCING POSITIVE ELECTRODE ACTIVE MATERIAL PARTICLES FOR BATTERY

TECHNICAL FIELD

The present invention relates to a process for producing positive electrode active material particles for a battery to obtain a positive electrode active material that has excellent discharge characteristics of a battery and a process for producing a positive electrode composition for a battery using the positive electrode active material particles for a battery, and especially it is useful as a process for producing lithium manganate or the like that can be preferably used as a positive electrode active material of a lithium ion battery.

BACKGROUND ART

A non-aqueous electrolyte secondary battery has characteristics of high working voltage and high energy density compared to a conventional nickel-cadmium secondary battery or the like, and it has been broadly used as a power supply of electronic equipment. A lithium transition metal complex oxide typified by lithium cobaltate, lithium nickelate, lithium manganate or the like has been used as a positive electrode material of the non-aqueous electrolyte secondary battery.

Among these, lithium manganate has advantages such that a raw material is easily obtained with a low cost and that it has lower impact to the environment because a large amount of manganese exists as a resource which is a constituent element of lithium manganate. Because of this, a non-aqueous electrolyte secondary battery using lithium manganate has been conventionally used in mobile electronic equipment typified by mobile phones, laptops, or digital cameras.

Because of enhancement of the functions of the mobile electronic equipment such that various functions are added, its use at high temperature or low temperature or the like, the required characteristics of a non-aqueous electrolyte secondary battery used in the mobile electronic equipment has been demanded more and more in recent years. Further, a non-aqueous electrolyte secondary battery is expected to be used as a power supply of a battery for an electric car or the like, and a battery has been demanded which is capable of high-output and high-speed discharge to be able to follow the quick-start and quick-acceleration of a car.

Because of that, attempts have been carried out to improve the smooth insertion and release function of lithium ions by making the average particle size of the positive electrode active material particles such as lithium manganate particles small. For example, a process is disclosed in Patent Document 1 described below for producing lithium manganate having an average preliminary particle size of 0.01 to 0.2 µm and an average secondary particle size of 0.2 to 100 µm by mixing manganese oxide having an average preliminary particle size of 0.01 to 0.2 µm with a lithium compound and the like to be fired, and then pulverizing the mixture.

However, it is difficult to obtain a diffusion space that is enough for lithium ions to be smoothly inserted and released only by making the average particle size of the positive electrode active material particles small or by controlling the average particle size of aggregate particles as in the above-described production process. Further, when producing a positive electrode using the positive electrode active material particles, there is a problem that it is difficult to secure a diffusion space of lithium ions with stability due to mixing of a binder and the like or due to making the particles into a paste.

Then, there is an attempt for actively forming a space by making the positive electrode active material particles porous besides the space generated in a gap between the positive electrode active material particles for the purpose of expanding the diffusion space of lithium ions.

For example, a process has been proposed in Patent Document 2 described below for producing positive electrode active material particles in which porous particles are formed by producing a mixture containing preliminary particles of a lithium-containing complex oxide and pore-forming particles and then by removing a constituent material of the pore-forming particles contained in the mixture. On this occasion, a process is disclosed for removing a part of the constituent material by using resin particles such as polystyrene particles as the pore-forming particles, heating the mixture to 300 to 600° C., and thermally decomposing the resin particles.

However, in the production process described in Patent Document 2, it has been found that the structure of the mixture after heating is not stabilized, and the pore-forming property is not sufficient, and the charging and discharging characteristics can not be improved sufficiently when constituting a positive electrode composition for a battery by further pulverizing the mixture. In the production process described in Patent Document 2, because the positive electrode active material particles are bound to each other by thermally decomposing the resin particles that are the pore-forming particles and then leaving apart of the particles, it has been found that the resin and the like are easily left also on the surface of the positive electrode active material particles and that the remained component can easily become a hindrance to insertion and release of lithium ions on the surface of the positive electrode active material particles.

On the other hand, a process is disclosed in Patent Document 3 described below for granulation by a spray drying method using a lithium salt such as lithium carbonate as an open pore-forming agent. However, a specific process using resin particles is not described.

PRIOR ART DOCUMENTS

Patent Documents
    Patent Document 1: Japanese Patent Application Laid-Open No. 2002-104827
    Patent Document 2: Japanese Patent Application Laid-Open No. 2005-158401
    Patent Document 3: Japanese Patent Application Laid-Open No. 2004-83388

SUMMARY OF THE INVENTION

Problems to be Solved by the Invention

In the mixing of the active material particles with the pore-forming particles or the open pore-forming agent, mixing at a particle level is preferable. However, it has been found that it is difficult to uniformly disperse both types of particles in the process of Patent Document 2 because the concentration of the solid content of the mixture paste before heating is high. Further, in the process for simply mixing the active material particles with the open pore-forming agent and spray drying the mixture as in Patent Document 3, because aggregation between the active material particles and aggregation between the open pore-forming agents occur by coexistence, it has been found that it is difficult to obtain granules of the mixture in which both the particles and the agents are mixed. When mixing of the active material particles with the pore-forming particles or the open pore-forming agent is non-uniform, it has also been found that a side reaction occurs easily during firing.

An object of the present invention is to provide a process for producing positive electrode active material particles for a battery having low internal resistance and excellent high-speed discharge characteristics by forming a stable porous structure and a process for producing a positive electrode composition for a battery using the positive electrode active material particles for a battery.

Means to Solve the Problems

First, the general structure and the action mechanism of a non-aqueous electrolyte secondary battery are described using a lithium ion battery as an example. An electrolyte containing a lithium salt in a non-aqueous solvent is used in the lithium ion battery, and the lithium ion battery has a structure in which a positive electrode having a positive electrode active material and a negative electrode having a negative electrode active material are separated from each other by a separator interposed therebetween. Further, because conductivity of the positive electrode material itself is low in the positive electrode, a conductive material such as carbon black is added to improve the conductivity.

The positive electrode as described above is generally produced by applying a slurry obtained by mixing an active material such as $LiMn_2O_4$, a conductive material such as carbon black, a binder, and a solvent onto a metal foil that becomes a collector, and drying the slurry. As a result, the microstructure of the positive electrode becomes a structure in which the positive electrode active material particles having low conductivity and conductive material particles having a particle size smaller than that of the positive electrode active material particles are dispersed and bonded.

In the positive electrode of a lithium ion battery, lithium ions are absorbed in the positive electrode active material during discharge. At this time, the discharge proceeds by the action between the lithium ions diffusing to the positive electrode side and electrons conducted from a positive electrode collector. Further, the electrons and the lithium ions are released from the positive electrode active material during charging. Because of this, selection of a conductive material having high conductivity and a microstructure of the positive electrode active material become very important as factors that influence characteristics of a battery, especially the high-speed discharge characteristics (higher output).

As described above, the positive electrode active material for a battery of the present invention is a positive electrode constituent material of a non-aqueous electrolyte secondary battery, and refers to a material that performs the action of absorbing and releasing metal ions during charging and discharging.

The present inventors have found that positive electrode active material particles for a battery having excellent high-speed discharge characteristics are obtained by mixing resin particles with lithium complex oxide particles in a polar solvent in the presence of a specific cationic surfactant and/or a specific polyvinyl alcohol derivative and removing the resin particles from a composition obtained by removing the polar solvent from the mixture, and thus the present invention has been completed.

That is, the process for producing positive electrode active material particles for a battery of the present invention is a process for producing positive electrode active material particles for a battery including a step of providing a slurry including resin particles, a cationic surfactant and/or a polyvinyl alcohol derivative, lithium complex oxide particles, and a polar solvent; removing the polar solvent from the slurry to give a composition; and firing the composition and at the same time, removing the resin particles from the composition, wherein the cationic surfactant is a quaternary ammonium salt, the polyvinyl alcohol derivative is a polyvinyl alcohol into which a quaternary ammonium salt group has been introduced or which has been substituted by a quaternary ammonium salt group, and the resin particles have an average particle size of 0.1 to 20 μm.

Further, the process for producing a positive electrode composition for a battery of the present invention is a process for producing a positive electrode composition for a battery containing positive electrode active material particles for a battery and a conductive material, and has a feature that the positive electrode active material particles for a battery are positive electrode active material particles for a battery obtained by the process for producing positive electrode active material particles for a battery of the present invention.

Furthermore, various physical property values in the present invention are specifically measured by the measurement method described in examples.

Effects of the Invention

According to the production process of the present invention, positive electrode active material particles for a battery and a positive electrode composition for a battery having excellent high-speed discharge characteristics are obtained because the porous structure is stable and it is less likely to undergo hindrance of ion conduction caused by residues.

MODE FOR CARRYING OUT THE INVENTION

Figure 1:
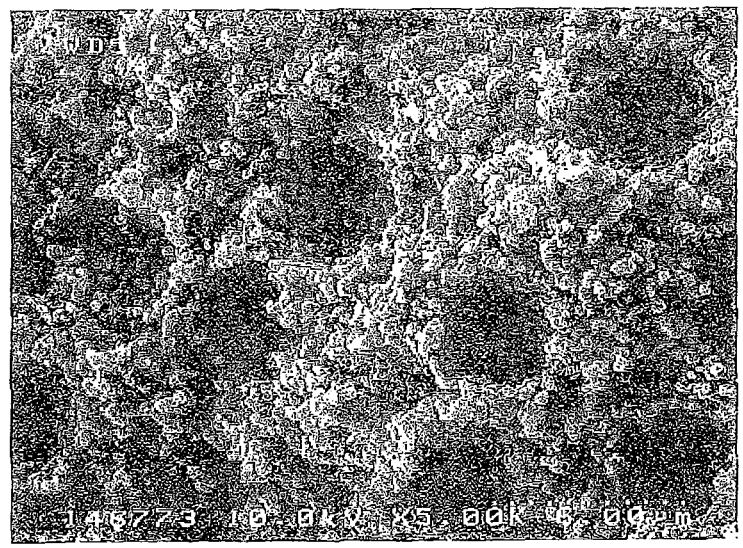
FIG. 1 is a photograph taken by scanning electron microscope (SEM) of a sintered lithium complex oxide after a firing step is performed and before a particle size adjusting step is performed in Example 2.

In the process for producing positive electrode active material particles for a battery of the present invention, a slurry including resin particles having a specific average particle size, a specific cationic surfactant and/or a specific polyvinyl alcohol derivative, lithium complex oxide particles, and a polar solvent is provided; the polar solvent is removed from the slurry to give a composition; the composition is fired and at the same time, the resin particles are removed from the composition to give a sintered lithium complex oxide.

A quaternary ammonium salt is used as the cationic surfactant. Further, the polyvinyl alcohol derivative is a polyvinyl alcohol into which, as a functional group, a quaternary ammonium salt group has been introduced or which has been substituted by a quaternary ammonium salt group, and is preferably a polyvinyl alcohol into which a quaternary ammonium salt group has been introduced or which has been substituted by a quaternary ammonium salt group in the side chain. Because the cationic surfactant and/or the polyvinyl alcohol derivative exist in the slurry of the present invention, it is considered that resin particles (hereinbelow, also referred to as surface-modified resin particles) are obtained whose surface is modified by at least one type of these and in which the $\zeta$ potential shows a positive value. Accordingly, it is considered that heterogeneous aggregates can be formed easily between these resin particles and the lithium complex oxide particles in which the $\zeta$ potential shows a negative value, as describe later.

Examples of the quaternary ammonium salt as the cationic surfactant include alkyltrimethyl ammonium salts such as QUARTAMIN 24P, QUARTAMIN 60W, and QUARTAMIN 86W, each of which is manufactured by Kao Corporation, dialkyldimethyl ammonium salts such as QUARTAMIN D86P and QUARTAMIN D2345P, each of which is manufactured by Kao Corporation, alkoxypropyltrimethyl ammonium salts such as QUARTAMIN E-80K manufactured by Kao Corporation, and alkyldimethylbenzyl ammonium salts such as SANISOL C, SANISOL B-50, and SANISOL P, each of which is manufactured by Kao Corporation. Further, examples of the polyvinyl alcohol derivative include cationized polyvinyl alcohols such as polyvinyl alcohol having a quaternary ammonium salt group in the side chain (GOHSEFIMER K-210, manufactured by Nippon Synthetic Chemical Industry Co., Ltd.). Among these, alkyltrimethyl ammonium salts and cationized polyvinyl alcohols are preferable from the viewpoint of affinity with the polar solvent.

The amount of the quaternary ammonium salt and/or the polyvinyl alcohol derivative added to the slurry is preferably in a range of 0.05 to 20 parts by weight relative to 100 parts by weight of the resin particles for charge adjustment. When it is in this range, the charge can be adjusted sufficiently and a side reaction becomes difficult to occur in the firing step described later. From the same viewpoint, the added amount is more preferably in a range of 0.1 to 15 parts by weight, and further preferably 0.5 to 15 parts by weight.

The type of the polar solvent is not especially limited. However, a polar solvent is preferable having a relative dielectric constant of 10 to 100, which is measured under the condition of a temperature of 20° C. with a frequency range, in order to easily obtain the surface-modified resin particles in which the $\zeta$ potential shows a positive value. From the same viewpoint, the relative dielectric constant is more preferably 15 or more, and further preferably 20 or more. Examples of the polar solvent having a relative dielectric constant in the above-described range include water, ethyl alcohol, and methyl ethyl ketone, and a water solvent is preferable in order to easily control the polymerization reaction described later and in order to easily obtain the surface-modified resin particles in which the $\zeta$ potential shows a positive value, and ion exchanged water and distilled water are more preferable for reasons such that no impurities are mixed therein and that there is no side reaction, and ion exchanged water is furthermore preferable.

The average particle size of the resin particles is 0.1 to 20 µm from the viewpoints that transfer of lithium ions is made easy, that the energy density is increased when being made into an electrode by increasing the bulk density of the obtained sintered lithium complex oxide, that uniform heterogeneous aggregates can be easily obtained, and that the porous structure of the positive electrode active material can be easily obtained. From the same viewpoints, it is preferably 0.1 to 10 µm, more preferably 0.1 to 7 µm, and further preferably 0.2 to 6 µm.

The resin particles are preferably used which is solid at room temperature, and is oxidatively decomposed at a temperature where the lithium complex oxide is sintered. Examples thereof include polystyrenes, polyolefins, fluorine resins, poly(meth)acrylates, poly(meth)acrylonitriles, poly(meth)acrylamides, and copolymers thereof, they may be the products from the market, or particles may be used which are obtained separately by polymerization. Among these, resin particles are preferable which is obtained by the emulsion polymerization or the suspension polymerization of an ethylenically unsaturated monomer in the presence of the cationic surfactant and/or the polyvinyl alcohol derivative in the polar solvent from the viewpoint of easily obtaining the surface-modified resin particles in which the $\zeta$ potential shows a positive value. This is because the surface-modified resin particles can be easily obtained in which the $\zeta$ potential shows a positive value. An example of a process for producing the preferred resin particles is described later.

Preferred examples of the lithium complex oxide that constitute the lithium complex oxide particles include a Li—Mn complex oxide such as lithium manganate ($LiMn_2O_4$ and the like), a Li—Co complex oxide such as lithium cobaltate ($LiCoO_2$ and the like), a Li—Ni complex oxide such as lithium nickelate ($LiNiO_2$ and the like), and a Li—Fe complex oxide such as lithium ironate ($LiFeO_2$ and the like), which can discharge lithium ions, from the viewpoints of having a high potential and securing output characteristics. Among these, lithium cobaltate, lithium nickelate, and lithium manganate are preferable from the viewpoints of excellent thermal stability, electric capacity, and output characteristics. Lithium manganate is more preferable from the viewpoints that the raw material can be easily obtained at a low cost, that it has a lower relative impact to the environment, and that it has excellent thermal stability. Lithium cobaltate is more preferable from the viewpoint of output characteristics. Further, lithium nickelate is more preferable from the viewpoint that it has an excellent electric capacity.

The crystal phase of lithium manganate is preferably a spinel type from the viewpoints of having a high potential and securing output characteristics, and specifically it is satisfactory as long as the main peaks obtained by X-ray diffraction analysis are coincident with or have the same level with those of $LiMn_2O_4$ shown in JCPDS (Joint Committee on Powder Diffraction Standards): No. 35-782. For lithium cobaltate, it is satisfactory as long as the main peaks are coincident with or have the same level with those of $LiCoO_2$ shown in JCPDS: No. 50-653. For lithium nickelate, it is satisfactory as long as the main peaks are coincident with or have the same level with those of $LiNiO_2$ shown in JCPDS: No. 9-63.

The average particle size of the lithium complex oxide particles is preferably 0.1 to 5 µm, more preferably 0.3 to 4 µm, and further preferably 0.5 to 2 µm from the viewpoints of securing high output characteristics, improving the film forming property of a coating film, and improving the electric capacity by increasing crystallinity.

An adjustment of the average particle size of the lithium complex oxide particles can also be performed by dry pulverizing. However, it is preferably performed by wet pulverization in the presence of a solvent. In the wet pulverization, a ball medium type mill is preferably used such as a wet bead mill, a ball mill, an attritor, and a vibration mill.

In the present invention, the polar solvent is removed from the slurry to give a composition containing the resin particles, the cationic surfactant and/or the polyvinyl alcohol derivative, and the lithium complex oxide particles, and then this composition is fired and at the same time, the resin particles are removed from the composition to give a sintered lithium complex oxide. The polar solvent is preferably removed while stirring or shaking.

Further, in the present invention, the slurry practically includes the resin particles, the cationic surfactant and/or the polyvinyl alcohol derivative, the lithium complex oxide particles, and the polar solvent. Accordingly, it is considered that by using the lithium complex oxide particles in which the ζ potential shows a negative value and the surface-modified resin particles in which the ζ potential shows a positive value and utilizing an attractive force due to an electric charge between these particles when removing the polar solvent, the lithium complex oxide particles and the surface-modified resin particles, can be mixed at a particle level and at the same time, a side reaction becomes difficult to occur in the firing step described later. That is, it is considered in the present invention that aggregation only between the lithium complex oxide particles and aggregation only between the resin particles are prevented and that the lithium complex oxide particles and the resin particles can be uniformly mixed at a particle level. Accordingly, it is considered that the sintered lithium complex oxide having a stable porous structure can be provided.

Further, it is considered that aggregates in which the lithium complex oxide particles and the surface-modified resin particles are mixed at a particle level (hereinbelow, also referred to as heterogeneous aggregates) can be obtained when removing the polar solvent. That is, the heterogeneous aggregates can be obtained as a composition containing the resin particles, the cationic surfactant and/or the polyvinyl alcohol derivative, and the lithium complex oxide particles.

The content of the resin particles in the aggregates is preferably 0.1 to 40% by weight, more preferably 1 to 30% by weight, and further preferably 2 to 16% by weight in the aggregates from the viewpoints of preferably securing a pore size and preferably performing sintering of the lithium complex oxide and the like.

When using a Li—Mn complex oxide as the lithium complex oxide, the content of the resin particles in the aggregates is preferably 1 to 30 parts by weight, and more preferably 5 to 10 parts by weight relative to 100 parts by weight of the complex oxide from the viewpoint of battery characteristics. When using a Li—Co complex oxide as the lithium complex oxide, the content of the resin particles in the aggregates is preferably 1 to 40 parts by weight, and more preferably 5 to 25 parts by weight relative to 100 parts by weight of the complex oxide from the viewpoint of battery characteristics. When using a Li—Ni complex oxide as the lithium complex oxide, the content of the resin particles in the aggregates is preferably 1 to 30 parts by weight, and more preferably 8 to 16 parts by weight relative to 100 parts by weight of the complex oxide from the viewpoint of battery characteristics.

It is important to adjust the average particle size of the resin particles and to adjust the surface electric charges of the resin particles dispersed into the polar solvent in order to preferably constitute the heterogeneous aggregates.

The average particle size of the resin particles is adjusted in a range of 0.1 to 20 μm from the viewpoints that transfer of lithium ions is made easy, that the energy density is increased when being made into an electrode by increasing the bulk density of the obtained sintered lithium complex oxide, that uniform heterogeneous aggregates can be easily obtained, and that the porous structure of the positive electrode active material can be easily obtained. The average particle size in the prescribed range can be adjusted by controlling the concentration of an initiator when polymerizing the particles from the ethylenically unsaturated monomer described later, the polymerization reaction temperature, the aging temperature or the like. For example, the average particle size of the resin particles can be easily adjusted in the above-described prescribed range by making the concentration of the initiator 0.1 to 5% by weight, the polymerization reaction temperature 40 to 80° C., and the aging temperature 60 to 80° C. Further, the average particle size of the resin particles can be also easily adjusted in the above-described prescribed range by controlling the amount of the added quaternary ammonium salt and/or the polyvinyl alcohol derivative in the preferable range described above.

The adjustment of the surface charges of the resin particles can be easily performed by controlling the amount of the added quaternary ammonium salt and/or the polyvinyl alcohol derivative in the preferable range described above.

In order to more easily mix the lithium complex oxide particles with the surface-modified resin particles at a particle level, the ζ potential of the lithium complex oxide particles is preferably −1 to −100 mV, and the ζ potential of the surface-modified resin particles is preferably +1 to +100 mV, the ζ potential of the lithium complex oxide particles is more preferably −20 to −100 mV, and the ζ potential of the surface-modified resin particles is more preferably +10 to +100 mV, and the ζ potential of the lithium complex oxide particles is further preferably −30 to −100 mV, and the ζ potential of the surface-modified resin particles is further preferably +20 to +100 mV.

Moreover, in the present invention, other components may be added to the slurry in a range where the heterogeneous aggregation is not hindered and where the effects of the present invention are not hindered. Specific examples of the other components are described later.

Next, the preferred embodiment of the present invention (hereinbelow, also referred to as a present production process) will be described. The parts of the description below that are overlapping with the above-described content are omitted.

In the present production process, first, a slurry A is prepared which contains the resin particles having an average particle size in the above-described specific range, which are obtained by performing the emulsion polymerization or the suspension polymerization of an ethylenically unsaturated monomer in the presence of the cationic surfactant and/or the polyvinyl alcohol derivative in a polar solvent 1, and also contains the cationic surfactant and/or the polyvinyl alcohol derivative, and the polar solvent 1 (Step 1). Next, a slurry C is obtained by mixing the lithium complex oxide particles with the slurry A or by mixing a slurry B containing the lithium complex oxide particles and a polar solvent 2 with the slurry A (Step 2). Next, a composition containing the resin particles, the cationic surfactant and/or the polyvinyl alcohol derivative, and the lithium complex oxide particles is obtained by removing the polar solvent 1 or the polar solvents 1 and 2 from the slurry C (Step 3). Then a sintered lithium complex oxide is obtained by firing the composition and at the same time, removing the resin particles from the composition (Step 4). Moreover, the "polar solvent 1" or the "polar solvents 1 and 2" in the present production process corresponds to the "polar solvent" in the present invention described above. The "slurry C" in the present production process corresponds to the "slurry" in the present invention described above.

In Step 1, the slurry A is prepared which practically includes the resin particles, the cationic surfactant and/or the polyvinyl alcohol derivative, and the polar solvent 1 by performing the emulsion polymerization or the suspension polymerization of an ethylenically unsaturated monomer in the presence of the cationic surfactant and/or polyvinyl alcohol derivative. Accordingly, it is considered that resin particles whose surface is modified by the cationic surfactant and/or the polyvinyl alcohol derivative and in which the ζ potential shows a positive value (surface-modified resin particles) are obtained. Accordingly, it is considered that heterogeneous aggregates can be formed easily between these resin particles and lithium complex oxide particles in which the ζ potential shows a negative value as describe later.

The resin particles obtained by polymerizing the ethylenically unsaturated monomer are solid at room temperature, and are preferably oxidatively decomposed at a temperature where the lithium complex oxide is sintered (600° C. or more). Therefore, vinylidene fluoride, ethylene fluoride, acrylonitrile, or acrylic acid, methacrylic acid, and esters thereof such as methylmethacrylate and butylmethacrylate are preferable as the ethylenically unsaturated monomer. Among these, acrylic acid, methacrylic acid, and esters thereof are more preferable, and methylmethacrylate and butylmethacrylate such as t-butylmethacrylate are further preferable from the points that it has excellent affinity with the polar solvent and that the adjustment of the particle size is relatively easily performed in a range of 0.1 to 20 μm. The obtained resin particles may be a homopolymer or a copolymer.

The concentration of the obtained resin particles is preferably in a range of 1 to 60% by weight, more preferably in a range of 2 to 40% by weight, and further preferably in a range of 3 to 25% by weight relative to the entire slurry A from the viewpoints of dispersion stability of the resin particles and adjustment of the concentration of a solid content of the slurry C in a preferred range.

In the present production process, the slurry A practically includes the resin particles, the cationic surfactant and/or the polyvinyl alcohol derivative, and the polar solvent 1. However, in the present production process, other components maybe added to the slurry A in a range where the heterogeneous aggregation described later is not hindered and where the effects of the present invention are not hindered.

Examples of the other components include a nonionic surfactant used as an emulsifier or a suspending agent when emulsifying or suspending the ethylenically unsaturated monomer, an amphoteric surfactant, and a cationic surfactant other than the quaternary ammonium salt. Among these, a nonionic surfactant is preferable because the ethylenically unsaturated monomer before the reaction can be uniformly dispersed into the polar solvent 1 when the nonionic surfactant is used. The amount of the added nonionic surfactant is preferably 0.01 to 10 parts by weight, more preferably 0.1 to 10 parts by weight, and further preferably 0.5 to 10 parts by weight relative to 100 parts by weight of the ethylenically unsaturated monomer from the viewpoint of the dispersion property of the ethylenically unsaturated monomer in the polar solvent 1.

In Step 2, the slurry C is obtained by mixing the lithium complex oxide particles with the slurry A or by mixing a slurry B practically including the lithium complex oxide particles and a polar solvent 2 with the slurry A. The slurry C is preferably obtained by mixing the slurry B with the slurry A in Step 2 from the viewpoints that uniform heterogeneous aggregates can be easily obtained and that the porous structure of the positive electrode active material can be easily obtained. This slurry C practically includes the slurry A and the lithium complex oxide particles or the slurry B.

In the slurry B, the concentration of the lithium complex oxide particles is preferably 1 to 40% by weight, more preferably 5 to 30% by weight, and further preferably 10 to 20% by weight. When it is in this range, it is considered that the lithium complex oxide particles can be uniformly dispersed, that the heterogeneous aggregates described later can be easily obtained, and that the concentration of the solid content of the slurry C can be adjusted in a preferred range. Moreover, a pulverization step such as wet pulverization may be carried out separately or when dispersing into the polar solvent 2 in order to obtain the slurry B in which the lithium complex oxide particles are uniformly dispersed.

The slurry B practically includes the lithium complex oxide particles and the polar solvent 2. However, in the present production process, other components may be added to the slurry B in a range where the heterogeneous aggregation described later is not hindered and where the effects of the present invention are not hindered.

Examples of the other components include an anionic surfactant such as POIZ 532A, manufactured by Kao Corporation and a nonionic surfactant such as EMULGEN 108 and RHEODOL 440V, manufactured by Kao Corporation from the viewpoint of uniformly dispersing the lithium complex oxide particles into the polar solvent 2. Among these, when an anionic surfactant is used, it is considered that the lithium complex oxide particles can be uniformly dispersed into the polar solvent 2 and that the surface charges of the lithium complex oxide particles can be made to be a state suitable for heterogeneous aggregation described later. The amount of the added anionic surfactant is preferably 0.05 to 10 parts by weight, and more preferably 0.1 to 5 parts by weight relative to 100 parts by weight of the lithium complex oxide particles from the viewpoint of the dispersion property of the lithium complex oxide particles.

Further, the slurry C practically includes the slurry A and the lithium complex oxide particles or the slurry B. However, in the present production process, other components may be added to the slurry C in a range where the heterogeneous aggregation described later is not hindered and where the effects of the present invention are not hindered.

The concentration of the lithium complex oxide particles in the slurry C is preferably 5 to 30% by weight, and more preferably 8 to 25% by weight in order to easily control the average particle size of the obtained sintered lithium complex oxide particles.

Examples of the other components that can be added to the slurry C include a cationic surfactant and a nonionic surfactant. When an anionic surfactant is added to the slurry B, a cationic surfactant is preferably added to the slurry C. This is because it is considered that re-separation of the formed heterogeneous aggregates can be prevented by counterbalancing charges between the cationic surfactant and the anionic surfactant. The quaternary ammonium salt and the polyvinyl alcohol derivative for modifying the surface of the resin particles can be used as the cationic surfactant. Among these, polyvinyl alcohol such as GOHSEFIMER K-210 having a quaternary ammonium salt group in the side chain can be preferably used as the cationic surfactant because it is considered that the formed heterogeneous aggregates can be stabilized. The amount of the added cationic surfactant is preferably 0.01 to 10 parts by weight, more preferably 0.04 to 5 parts by weight, and further preferably 0.1 to 2 parts by weight relative to 100 parts by weight of the lithium complex oxide particles added to the slurry C in order to certainly prevent re-separation of the heterogeneous aggregates. When adding the cationic surfactant, the cationic surfactant may be added to the slurry A in advance before preparing the slurry C, and then the lithium complex oxide particles or the slurry B may be blended with the mixture of the cationic surfactant and the slurry A or the slurry C may be prepared and then the cationic surfactant may be added to the slurry C. The amount of the cationic surfactant finally contained in the slurry C is preferably 0.01 to 10 parts by weight, and more preferably 0.04 to 5 parts by weight relative to 100 parts by weight of the lithium complex oxide particles.

In Step 3, a composition containing the resin particles, the cationic surfactant and/or the polyvinyl alcohol derivative, and the lithium complex oxide particles is obtained by removing the polar solvent 1 or the polar solvents 1 and 2 from the slurry C. The polar solvent is preferably removed while stirring or shaking.

Further, the slurry C is preferably aged before performing Step 3 by heating at a temperature from 30° C. or more to a temperature that does not exceed the glass transition temperature of the surface-modified resin particles for 10 to 300 minutes from the viewpoint of obtaining heterogeneous aggregates having a large particle size. It is not clear why the heterogeneous aggregates having a large particle size are obtained by aging. However, it is considered that heterogeneous aggregates that incorporate the lithium complex oxide particles grow when the partial polymerization reaction of the surface-modified resin particles occurs by aging and the heterogeneous aggregates having a large particle size is obtained. When the glass transition temperature of the surface-modified resin particles is 140° C. or less, the aging temperature is more preferably 40 to 120° C., and further preferably 50 to 100° C. from the viewpoints of obtaining heterogeneous aggregates having a larger particle size and the shape stability of the surface-modified resin particles. From the same viewpoints, the aging time is more preferably 30 to 240 minutes, and further preferably 60 to 180 minutes.

In Step 3, a method of removing the polar solvent may be any method of removing the polar solvent by reduced pressure drying, heat drying, vacuum drying, static drying, fluidized drying or the like, a method of spray drying the slurry C, and a combination thereof. However, reduced pressure drying, vacuum drying, and a combination thereof are preferable from the viewpoint that a rotational operation or the like is performed so that a more uniform composition of the obtained aggregates can be maintained. Further, a spray drying method is preferably adopted from the viewpoints that the average particle size after firing can be adjusted without disintegrating or lightly pulverizing the aggregates in advance and the porous structure can be stably maintained in Step 4 described later. The drying temperature when removing the polar solvent is not especially limited. However, when using water as the polar solvent, it is preferably 50 to 150° C., and more preferably 80 to 120° C. from the viewpoint of completely removing water from the slurry C.

The spray drying method is a preferable method in that the particle size can be adjusted arbitrarily during drying and that porous particles can be designed. In the adjustment of the particle size and the designing of the porous particles, the objective particle size and porous particles can be obtained by adjusting the concentration of the solid content of the spray liquid, the temperature of the spray liquid introducing part, the spraying pressure, the flow rate of the spray liquid, and the nozzle diameter of the spray drying apparatus. Especially, the concentration of the solid content of the spray liquid (slurry C) is important in the relationship of the designing of the porous particles and the adjustment of their particle size. The concentration thereof is preferably in a range of 1 to 50% by weight, more preferably in a range of 5 to 30% by weight, and further preferably in a range of 5 to 20% by weight.

In Step 4, the sintered lithium complex oxide is obtained by firing the composition (heterogeneous aggregates) and at the same time, removing the resin particles from the composition.

In Step 4, the resin particles are thermally decomposed and removed by firing the obtained composition. The firing of the composition is preferably performed in the preferred firing condition described later. This is because the sintering of the lithium complex oxide particles and the like and the production of porous active material particles by thermally decomposing and removing the resin particles can be performed in parallel.

In Step 4, the composition is preferably fired and at the same time, the resin particles and the cationic surfactant and/or the polyvinyl alcohol derivative are preferably thermally decomposed and removed from the composition from the viewpoint of preventing a side reaction when sintering the lithium complex oxide particles. The thermal decomposition and removal of the resin particles and the cationic surfactant and/or polyvinyl alcohol derivative becomes possible by, for example, firing the composition in the preferred firing condition described later.

It is considered that the firing treatment of the composition can provide the obtained porous structure with stable strength, improve the crystallinity of the sintered lithium complex oxide, and improve high-speed discharge characteristics because the insertion and release function of lithium ions of lithium manganate for example is easily exhibited. Moreover, in the present invention, the remaining lithium complex oxide particles and the like may be sintered after the resin particles are removed by thermal decomposition.

Sintering refers to a bonding reaction when powder particles bond to each other by the bonding reaction in which a pure solid phase between solids is mixed or a liquid phase is partially mixed due to heating of an assembly of mixed mineral powder (From "Encyclopedia of Chemistry (Kagaku Daijiten) 4" published in Oct. 15, 1981). Any one of the following states is preferably achieved in the present invention by firing the composition (aggregates) to a point where the lithium complex oxide particles are sintered.

(1) A porous sintered lithium complex oxide or its pulverized material includes constituent elements of a raw material for a sintered lithium complex oxide.
(2) A porous sintered lithium complex oxide or its pulverized material has a half-value width of 0.3 deg or less.
(3) A porous sintered lithium complex oxide or its pulverized material has a weight reduction (change) of less than 1% when fired (in air) at 600° C. for 1 hour.

The above-described half-value width refers to a half-value width at the strongest diffraction peak in the diffraction data obtained by powder X-ray diffraction analysis, and refers to a value digitized by the method of measurement described later and fitting. For example, it refers to a value digitized by the method described later for a diffraction peak belonging to a (111) face for lithium manganate ($LiMn_2O_4$), a (003) face for lithium cobaltate ($LiCoO_2$), and a (003) face for lithium nickelate ($LiNiO_2$).

When the resin particles are removed by firing, the firing is preferably performed while supplying a gas that vaporizes the product by reacting with the resin particles at a high temperature such as air and oxygen to the firing atmosphere.

The removal of the resin particles by firing is a method of vaporizing the reaction product by performing a chemical reaction with a gas, and it is preferably a method of oxidizing and vaporizing by heating in the presence of oxygen. The firing can be performed in the air atmosphere. However, it is preferably performed while flowing air or oxygen gas or a mixed gas of nitrogen and oxygen. Accordingly, the resin particles are removed completely, and a side reaction can be prevented when the lithium complex oxide particles are sintered.

The composition (aggregates) is preferably disintegrated or lightly pulverized in advance from the viewpoint of making the adjustment of the average particle size after firing easy. At this time, the disintegration or light pulverization is preferably performed by a dry treatment from the viewpoint of maintaining the complex structure of the composition. Such a treatment can be performed by disintegrating using a mortar, or by using a coffee mill and a mixer from the market or the like. When the removal of the polar solvent is performed by a spray dry method, such a treatment is not especially necessary.

The firing of the composition can be performed with various electric furnaces such as a box-shaped furnace, a crucible furnace, a tubular furnace, an electric furnace with bottom elevating system, a rotary kiln furnace and various furnaces. Among these, a box-shaped furnace is preferable from the viewpoint of atmosphere control. The highest temperature of firing is preferably 600° C. or more from the viewpoints that the thermal decomposition reaction of the resin particles can be performed completely and the removal of the resin particles can be performed completely, and that sintering of the lithium complex oxide particles can be performed sufficiently. On the other hand, it is preferably 1000° C. or less from the viewpoint of preventing a side reaction and the composition change of the lithium complex oxide particles.

When using a Li—Mn complex oxide as the lithium complex oxide, the highest temperature of firing is preferably 600 to 900° C., and more preferably 700 to 850° C. from the viewpoint of the battery characteristics. When using a Li—Co complex oxide as the lithium complex oxide, the highest temperature of firing is preferably 600 to 1000° C., and more preferably 700 to 950° C. from the viewpoint of the battery characteristics. When using a Li—Ni complex oxide as the lithium complex oxide, the highest temperature of firing is preferably 600 to 750° C., and more preferably 600 to 700° C. from the viewpoint of the battery characteristics.

The temperature may be increased to the highest temperature of firing at a constant speed or may be increased at a stepwise speed. When the temperature is increased at a constant speed, the temperature is increased at a slower speed than 500° C./hour, more preferably at a slower speed than 400° C./hour, further preferably at a slower speed than 300° C./hour from the viewpoint of maintaining a uniform temperature. The firing time is 1 hour or more from the viewpoints that the thermal decomposition reaction of the resin particles can be performed completely and the removal of the resin particles can be performed completely, and that the firing of the lithium complex oxide particles can be performed sufficiently. On the other hand, it is preferably 100 hours or less from the viewpoint of preventing a side reaction and the composition change of the lithium complex oxide particles.

The sintered lithium complex oxide obtained by firing can be used as the positive electrode active material particles for a battery as it is. However, when the removal of the polar solvent is performed by reduced pressure drying, vacuum drying, or a combination thereof, it is preferable that the sintered lithium complex oxide obtained by firing is made into the sintered lithium complex oxide particles through a pulverization step so that a prescribed particle size can be achieved (particle size adjusting step) and used as the positive electrode active material particles for a battery. When the removal of the polar solvent is performed by spray drying, such a step is not especially necessary, and the obtained sintered lithium complex oxide after the firing step is the sintered lithium complex oxide particles, and can be used as the positive electrode active material particles for a battery.

In any of the cases, it is desirable that the average particle size of the lithium complex oxide particles and the average particle size of the resin particles and the like are adjusted so that the peak pore size (maximum peak pore size) of the sintered particles becomes preferably 0.3 to 5 µm, more preferably 0.3 to 3.5 µm, and further preferably 0.5 to 3.0 µm, and the total pore volume of the sintered particles becomes preferably 0.10 to 2.00 mL/g, more preferably 0.35 to 1.50 mL/g, and further preferably 0.40 to 1.50 mL/g. In order to increase the maximum peak pore size of the sintered particles, the concentration of the solid content of the slurry C maybe increased or the average particle size of the resin particles may be increased for example. In order to increase the total pore volume, the content of the resin particles may be increased or the firing may be performed in the above-described preferred condition for example.

The positive electrode active material particles (sintered lithium complex oxide particles) obtained by the production process of the present invention preferably have physical properties as described below. The pore size of the positive electrode active material particles is preferably large from the viewpoint of achieving a smooth transfer of lithium ions. However, it is not preferable to be too large from the viewpoint of maintaining the electrode density. The peak pore size (maximum peak pore size) measured by a mercury porosimeter is preferably 0.3 to 5 µm, more preferably 0.3 to 3.5 µm, and further preferably 0.5 to 3.0 µm.

From the same viewpoints, the ratio (d2/d1) of a pore size d2 of the obtained positive electrode active material particles to an average particle size d1 of the lithium complex oxide particles used in Step 2 is preferably 1 to 50, and more preferably 1.2 to 20.

A BET specific surface area of the positive electrode active material particles is preferably 1.0 $m^2/g$ or more from the viewpoint of promoting transfer of lithium ions. Further, it is more preferably 10.0 $m^2/g$ or less, and more preferably 4.0 $m^2/g$ or less from the viewpoint of a decrease of a binder content when producing a positive electrode. By combining the above-described viewpoints, the BET specific surface area of the positive electrode active material particles is preferably 1.0 to 10.0 $m^2/g$, and more preferably 1.0 to 4.0 $m^2/g$. The preferred BET specific surface area is obtained by selecting the preferred range described above as the firing condition and firing so that the raw material for the positive electrode active material is sintered.

Further, the total pore volume of the positive electrode active material particles measured by a mercury porosimeter is preferably 0.10 to 2.00 mL/g, more preferably 0.35 to 1.50 mL/g, and further preferably 0.40 to 1.50 mL/g from the viewpoint of a balance between the porosity necessary for transfer of lithium ions and the energy density.

The half-value width of the strongest peak in the X-ray diffraction of the positive electrode active material particles (sintered lithium complex oxide particles) obtained by the present invention is preferably 0.12 to 0.30 deg, and more preferably 0.12 to 0.25 deg as a value obtained by the method described in examples from the viewpoint of enhancing the high-speed discharge characteristics by improving the crystallinity. In the case of sintered lithium manganate particles, it is more preferably 0.12 to 0.20 deg, in the case of sintered lithium cobaltate particles, it is more preferably 0.15 to 0.25 deg, and in the case of sintered lithium nickelate particles, it is more preferably 0.15 to 0.25 deg. The above-described preferred half-value width can be obtained by selecting the preferred range described above as the firing condition and firing so that the raw material for the positive electrode active material (lithium complex oxide particles) is sintered.

The positive electrode active material particles (sintered lithium complex oxide particles) obtained by the present invention are preferably spherical secondary particles formed by sintering preliminary particles from the viewpoint of securing the diffusion space of lithium ions. "Preliminary particles" indicates the smallest unit of particles that can be confirmed as particles when observing with an electron microscope (5000×). The "spherical" refers to secondary particles observed by an electron microscope (1000 to 5000× depending on the particle size) having a ratio of the longest diameter to the shortest diameter (the longest diameter/the shortest diameter) of 1.2 or less. The spherical secondary particles formed by sintering the preliminary particles can be obtained by performing the removal of the polar solvent by a spray drying method and selecting the preferred range described above as the firing condition and firing so that the raw material for the positive electrode active material is sintered.

The pore size of the positive electrode active material particles (sintered lithium complex oxide particles) obtained by the present invention, which gives the maximum differential pore volume (maximum peak pore size) in a range of the pore size of 0.01 to 10 μm in the pore distribution that is measured by a mercury porosimeter, is preferably 0.3 to 5 μm, more preferably 0.3 to 3.5 μm from the viewpoints of reducing the internal resistance and of improving the energy density, and one peak that gives a differential pore volume that is 10% or more of the maximum differential pore volume (hereinbelow, referred to as a sub-peak) preferably exists in the side of the pore size that is smaller than the maximum peak pore size. The "differential pore volume" is obtained by a method using a mercury porosimeter described in page 125 of Experimental Chemistry Lectures Vol. 13, $4^{th}$ edition (1993), edited by the Chemical Society of Japan and published by Maruzen Co., Ltd., and indicates a value obtained by differentiating a total volume V of particles having the corresponding pore size or more by common logarithms log R of the pore size R (value of d V/d log R). The pore size of the sub-peak is preferably 0.50 to 2.20 μm, more preferably 0.50 to 2.00 μm, and further preferably 0.70 to 1.80 μm from the viewpoints of reducing the internal resistance, improving the high-speed discharge characteristics, obtaining good battery characteristics even by decreasing the conductive material and the binder content when forming the positive electrode for a battery, and improving the film forming property of the coating film. The pore having a pore size of 0.3 to 5 μm, which is the maximum peak pore size, is considered to be a pore generated by a gap between the positive electrode active material particles. It is considered that the pore corresponds to a pore that is filled by the conductive material such as carbon black when it is used in the positive electrode for a battery and corresponds to a pore that makes the flow of electrons smooth and plays a role of reducing the resistance of the electrode. The pore of the sub-peak is considered to be a pore inside of the positive electrode active material particles. In this case, it is considered that the insertion and release of lithium ions are performed smoothly by lithium ions entering in this pore when it is used in the positive electrode for a battery. According to the above-described pore, it is considered that positive electrode active material particles having excellent high-speed discharge characteristics can be provided. Moreover, the preferred pore distribution is obtained by performing the removal of the polar solvent with a spray drying method, selecting the preferred range described above as the firing condition, and firing so that the raw material for the positive electrode active material is sintered.

The positive electrode active material particles such as lithium manganate obtained by the present invention can be preferably used as the positive electrode active material particles of a lithium ion battery. Therefore, the process for producing a positive electrode composition for a battery of the present invention is a method for producing a positive electrode composition for a battery containing the positive electrode active material particles obtained by the above-described process for producing positive electrode active material particles for a battery and a conductive material. The process for producing a positive electrode composition for a battery of the present invention preferably has the step of preparing a slurry for forming a positive electrode in which the positive electrode active material particles for a battery, which are obtained by the above-described process for producing positive electrode active material particles, the conductive material, a binder, and a solvent are mixed. The positive electrode of a lithium ion battery can be produced by applying the slurry for forming a positive electrode onto a metal foil that becomes a collector and drying the slurry, and a lithium ion battery is produced by laminating the positive electrode together with a negative electrode and a separator and injecting an electrolyte.

The process for producing a positive electrode composition for a battery of the present invention preferably has the step of adjusting the average particle size of the positive electrode active material particles for a battery to 0.8 to 15 times, more preferably 1.0 to 8 times, and further preferably 1.2 to 5 times that of the average particle size of resin particles in the above-described slurry (slurry A). When the average particle size of the positive electrode active material particles for a battery is adjusted in the above-described range, the average particle size of the positive electrode active material particles for a battery can be preferably made to be 1 to 10 times, more preferably 1.5 to 8 times, and further preferably 2 to 5 times of its pore size even when the particle distribution of the resin particles, and the case where the heterogeneous aggregates shrink when it is fired in Step 4 and the like are considered. Accordingly, when the particles are used in the production of a positive electrode for a battery, smoothness of the coating film can be easily maintained, and at the same time, the insertion and release of lithium ions at the obtained positive electrode for a battery can be furthermore improved. The average particle size of the positive electrode active material particles for a battery is desired to be adjusted by pulverization and classification. The "pulverization" is a concept including disintegration and light pulverization. As a method of adjusting the average particle size of the positive electrode active material particles for a battery within the range, disintegration or pulverization is preferably performed on the positive electrode active material particles after firing with a wet or dry treatment. Further, the classification of the obtained particles may be performed.

When performing the wet treatment, the positive electrode active material particles are added at a concentration of 5 to 30% by weight to a polar solvent that is the same as above. When an ultrasonic homogenizer such as homogenizer US series manufactured by NIHONSEIKI KAISHA LTD. is used, ultrasonic waves are irradiated preferably at a condition of a rated power of 50 to 3000 W and an oscillatory frequency of 10 to 30 kHz, preferably for 30 seconds to 10 minutes and more preferably for 30 seconds to 3 minutes. And then the polar solvent maybe removed by evaporation.

Further, when performing the dry treatment, the positive electrode active material particles may be pulverized using a rotor speed mill (P-14, manufactured by Fritsch GmbH) for example with a rotation number preferably in a range of 6000 to 20000 rpm and more preferably in a range of 6000 to 15000 rpm and a sieving ring mesh condition of 0.08 to 6.0 mm.

Any of the conventional conductive materials used to form a positive electrode can be used as the conductive material, and the conductive material including carbon such as carbon black, carbon fiber, carbon nano-tube or the like can be preferably used.

The content of the conductive material in the positive electrode composition for a battery is preferably 3 to 20 parts by weight, and more preferably 5 to 15 parts by weight relative to 100 parts by weight of the positive electrode active material particles from the viewpoints of improving the conductivity as a positive electrode and improving the energy density.

Any of the conventional binders used to form a positive electrode can be used as the binder, and polyvinylidene fluoride (PVDF), polyamideimide, polytetrafluoroethylene, polyethylene, polypropylene, polymethylmethacrylate or the like can be preferably used.

The content of the binder is preferably 5 to 20 parts by weight, and more preferably 10 to 15 parts by weight relative to 100 parts by weight of the positive electrode active material particles from the viewpoint of a better balance between the binding performance of the positive electrode active material particles and the conductive material and the conductivity as a positive electrode.

Any of the conventional solvents used to form a positive electrode can be used as the solvent. For example, N-methyl-2-pyrrolidone (NMP), dimethylformamide (DMF), dimethylacetamide, methyl ethyl ketone, tetrahydrofuran, acetone, ethanol, and ethyl acetate or the like can be preferably used. Further, any of the conventionally known additives used to form a positive electrode can be added to the slurry for forming a positive electrode.

The viscosity of the slurry for forming a positive electrode is preferably 1000 mPa·s or more, and more preferably 2000 mPa·s or more from the viewpoint of the thickness of the electrode to be obtained. Further, it is preferably 15000 mPa·s or less, and more preferably 10000 mPa·s or less from the viewpoint of the coating property onto the collector.

The concentration of the solid content of the slurry for forming a positive electrode is preferably 20% by weight or more, and more preferably 35% by weight or more from the viewpoint of the preferred slurry viscosity. Further, it is preferably 60% by weight or less, and more preferably 45% by weight or less from the viewpoint of the preferred slurry viscosity.

A lithium ion battery produced using the positive electrode active material particles obtained by the present invention has excellent high-speed discharge characteristics. For the high-speed discharge characteristics, the ratio of the discharge amount of 60 C relative to that of 1 C is preferably 50% or more, more preferably 65% or more, and further preferably 75% or more in the evaluation of the battery characteristics described later.

Use of a lithium ion battery is not especially limited, and it can be used in consumer equipments such as batteries for a cordless vacuum cleaner, a cordless power tool, an electric car, a hybrid car or the like, and an auxiliary power supply for a fuel cell car, as well as it can be used in electronic devices such as a laptop, an electronic book player, a DVD player, a mobile audio player, a video movie, a mobile TV, and a mobile phone. Among these, it is preferably used as a battery for a car which especially requires a high output.

EXAMPLES

Hereinbelow, examples and the like that specifically show the present invention will be described. Moreover, for evaluation items in the examples and the like, measurements were performed as follows.

<Measurement of ζ (Zeta) Potential>

An ion exchanged water slurry containing 0.1% by weight of lithium complex oxide particles or surface-modified resin particles was irradiated with ultrasonic waves at a frequency of 19 kHz at an output of 300 W using an ultrasonic homogenizer for one minute. The irradiation with ultrasonic waves was stopped, and after 5 minutes, the measurement of the ζ potential was performed on particles in the ion exchanged water slurry at 25° C. The measurement was performed using a zeta potential measurement apparatus (Nano-ZS, manufactured by Malvern Instruments, Ltd.) for a measurement apparatus, using a Disposable Zeta Cell that is an exclusive cell (made of polystyrene, 10 mm cell), setting the measurement applied voltage to be 150 V, and setting the measurement mode to be Auto for the entire process.

<Average Particle Size>

A value of a volume median particle size (D50) when the particle size distribution after irradiation with ultrasonic waves at an ultrasonic irradiation intensity level 4 for one minute was measured at a relative refractive index of 1.7 with water as a dispersion medium using a laser diffraction scattering type particle size distribution measurement apparatus (LA920, manufactured by Horiba, Ltd.), and was made to be the average particle size of the lithium complex oxide particles in the slurry B, the average particle size of the lithium complex oxide particles after pulverization of the bulk raw material and the average particle size of the positive electrode active material particles after firing.

A value of a volume median particle size (D50) when the particle size distribution after treatment with ultrasonic waves at an ultrasonic irradiation intensity level 4 for one minute was measured at a relative refractive index of 1.5 with water as a dispersion medium using a laser diffraction scattering type particle size distribution measurement apparatus (LA920, manufactured by Horiba, Ltd.) without delay by sampling about 1 mL of a polymer emulsion (slurry A), and was made to be the average particle size of the resin particles. According to the above-described measurement method, the average particle size of the resin particles or the average particle size of the surface-modified resin particles are obtained. However, in the present invention, the average particle size obtained by the above-described measurement method was made to be "the average particle size of the resin particles". Therefore, even when the average particle size of the surface-modified resin particles was obtained by the above-described method, its measurement value was made to be "the average particle size of the resin particles".

<Measurement of Pore Size and Pore Volume>

A pore volume in a range of 0.008 to 200 μm of the positive electrode active material particles (sintered lithium complex oxide particles) was measured using a mercury porosimeter (PoreSizer 9320, manufactured by Shimadzu Corporation), and the obtained value was made to be the total pore volume of the positive electrode active material particles. Further, the pore size of peak top of the maximum peak among peaks in the pore distribution obtained by the measurement was made to be the maximum peak pore size of the positive electrode active material particles.

<BET Specific Surface Area>

A BET specific surface area of the positive electrode active material particles (sintered lithium complex oxide particles) was measured by a nitrogen gas adsorption method using a specific surface area measurement apparatus (FlowSorbIII 2305, manufactured by Shimadzu Corporation).

<Measurement of Half-Value Width of X-Ray Diffraction Peak>

The measurement was performed on the positive electrode active material particles (sintered lithium complex oxide particles) using an X-ray diffractometer (RINT 2500, manufactured by Rigaku Corporation) at the conditions of an X-ray output of 40 kV and 120 mA; irradiation slits being made to be a radiating slit 1 deg, a receiving slit 0.3 mm, and a scattering slit 1 deg; and a scanning speed of 2 deg (2θ) per minute. Then, the half-value width was digitized by fitting the diffraction peak belonging to a (111) face for lithium manganate ($LiMn_2O_4$), a (003) face for lithium cobaltate ($LiCoO_2$), and a (003) face for lithium nickelate ($LiNiO_2$) with a false void function (Lawrence component ratio 0.5). The fitting was performed using a software, JADE (version 5.0) manufactured by Materials Data Incorporated.

<Constituent Elements of Sintered Lithium Complex Oxide>

The constituent elements of the obtained sintered lithium complex oxide were measured by an ICP analyzer. For cobalt, manganese, and nickel, the measurement was performed after dissolving 1 g of the sintered lithium complex oxide in a hydrochloric acid solution. For lithium, the measurement was performed using an atomic absorption analyzer after dissolving 1 g of the sintered lithium complex oxide in a hydrochloric acid solution. For oxygen, the measurement was performed using an oxygen analyzer. For carbon, the measurement was performed using a CHN analyzer.

<High-Speed Discharge Characteristics>

A slurry for forming a positive electrode was prepared by adding 83.3 parts by weight of polyvinylidene fluoride in a 12% by weight N-methyl-2-pyrrolidone solution (#1320, manufactured by Kureha Corporation), 10 parts by weight of carbon black (HS-100, manufactured by Denki Kagaku Kogyo Kabushiki Kaisha) as a conductive material, and 93.3 parts by weight of N-methyl-2-pyrrolidone as a solvent to 80 parts by weight of the positive electrode active material particles (sintered lithium complex oxide particles) and uniformly mixing the mixture. The slurry for forming a positive electrode was uniformly applied onto an aluminum foil (thickness 20 μm) used as a collector with a coater, and it was dried at 140° C. over 10 minutes or more. After drying, it was molded to have a uniform film thickness with a press machine, cut into a piece having a prescribed size (20 nun×15 mm), and made into a positive electrode for testing. At this time, the thickness of the electrode active material layer was 25 μm, the weight thereof was 19.5 mg, and the density thereof was 2.6 g/cm³. For the condition of the press machine, it was adjusted appropriately in a range of 3 to 10 ton/cm² so that the density became 2.6 g/cm³. A test cell was produced using the above-described positive electrode for testing. For the negative electrode used in the test cell, a metal lithium foil cut into a piece having a prescribed size (20 mm×15 mm) was used in Examples 1 to 6 and Comparative Examples 1 to 3. In Examples 7 to 14 and Comparative Example 4 and 5, a negative electrode produced by the following method was used. A slurry prepared by adding 99.8 parts by weight of polyvinylidene fluoride in a 10% by weight N-methyl-2-pyrrolidone solution (#9210, manufactured by Kureha Corporation) as a binder to 90 parts by weight of hard carbon (Carbotron P powder, manufactured by Kureha Corporation), adding 32.3 parts by weight of N-methyl-2-pyrrolidone to this mixture, and kneading the mixture, was applied onto a copper foil (thickness 15 μm), and dried at 140° C. over 10 minutes or more. After drying, it was molded to have a uniform film thickness with a press machine, cut into a piece having a prescribed size (20 mm×15 mm), and made into a negative electrode for testing. At this time, the thickness of the electrode active material layer was 20 μm, the weight thereof was 5.8 mg, and the density thereof was 1.0 g/cm³. For the condition of the press machine, it was adjusted appropriately in a range of 3 to 10 ton/cm² so that the density became 1.0 g/cm³.

For a separator that separates the positive electrode and the negative electrode, #2400 manufactured by Celgard, LLC was used. For an electrolyte, a solution was used in which $LiPF_6$ was dissolved in an ethylene carbonate/diethyl carbonate (1:1 vol %) solvent at a concentration of 1 mol/L. The assembly of the test cell was performed in a glove box under an argon atmosphere. After the assembly of the test cell, it was left at 25° C. for 24 hours, and then the evaluation of the following high-speed discharge characteristics was performed.

Constant-current charge and discharge was performed on the test cell at 0.2 C. Then, a capacity (A) of the test cell was obtained by (1) constant-current charging at 0.5 C and then constant-current discharging at 1 C, and a capacity (B) of the test cell was obtained by performing (1), and (2) constant-current charging at 0.5 C and then constant-current discharging at 60 C. The ratio of (B) to (A) was made to be the high-speed discharge characteristics.

High-speed discharge characteristics (%)=$B/A$×100

<Evaluation of Internal Resistance>

The internal resistance of the test cell obtained in the manner as described above was evaluated. Each battery was adjusted to about 60% of a fully charged state by charging to 4.0V at a constant current of 0.2 C and then performing a constant-voltage charge at 4.0 V for one hour. After that, the current was stopped for 60 seconds, and then the potential was measured. Next, discharge was performed at a constant current of 0.2 C for 10 seconds, and then the potential was measured ($1^{st}$ cycle). The difference of the potentials before and after discharge at this time was made to be a potential drop value. Next, after the current was stopped for 60 seconds, each battery was adjusted to about 60% of a fully charged state by charging to 4.0V at a constant current of 0.2 C and then performing a constant-voltage charge at 4.0 V for one hour in the same manner as described above. After that, the current was stopped for 60 seconds, and then the potential was measured. Next, discharge was performed at a constant current of 0.5 C for 10 seconds, and then the potential was measured ($2^{nd}$ cycle). This cycle was repeated until the $7^{th}$ cycle by changing the current value as shown in Table 1. A value of the internal resistance (Ω) of each battery was obtained from the slope of a primary approximate straight line of the values of the current-drop voltage plot in which the potential drop value obtained in each cycle was plotted in the y-axis, and the discharge current value was plotted in the x-axis.

TABLE 1

|  | CHARGE CURRENT | DISCHARGE CURRENT |
| --- | --- | --- |
| $1^{ST}$ CYCLE | 0.2 C | 0.2 C |
| $2^{ND}$ CYCLE | 0.2 C | 0.5 C |
| $3^{RD}$ CYCLE | 0.2 C | 1 C |
| $4^{TH}$ CYCLE | 0.2 C | 5 C |
| $5^{TH}$ CYCLE | 0.2 C | 15 C |
| $6^{TH}$ CYCLE | 0.2 C | 30 C |
| $7^{TH}$ CYCLE | 0.2 C | 60 C |

<Observation by Scanning Electron Microscope (SEM)>

The observation of the particles after the firing step was performed by an SEM (S-4000 manufactured by Hitachi, Ltd., at magnification of 5000×), and the forms of the particles were confirmed.

Example 1

<Production of Slurry A>

A dispersion was obtained by mixing 100 g of t-butyl-methacrylate, 300 g of ion exchanged water, 0.5 g of QUARTAMIN 24P manufactured by Kao Corporation (27% by weight aqueous solution of a lauryltrimethyl ammonium salt) as a cationic surfactant, 1 g of EMULGEN 1135S-70 manufactured by Kao Corporation as a nonionic surfactant, and 0.5 g of V-50 manufactured by Wako Pure Chemical Industries, Ltd. as an initiator and emulsifying the mixture by performing a dispersion treatment on the mixture for 5 minutes using an ultrasonic homogenizer (Ultrasonic Generator; MODEL US-300T, manufactured by NIHONSEIKI KAISHA LTD., probe diameter: 20 mm, V-LEVEL: 400 µA). Next, 20 g of this dispersion was placed in a 1 L separable flask, and 100 g of ion exchanged water was added thereto. This dispersion was aged by increasing the temperature to 80° C. while stirring under a nitrogen atmosphere, adding the remaining dispersion dropwise from a dropping funnel over 2 hours, and then stirring for 2 hours. After aging, it was cooled to room temperature and a polymer emulsion (slurry A) containing surface-modified resin particles (particles A) was obtained. The average particle size of the resin particles included in this polymer emulsion was 0.5 µm. Further, the $\zeta$ potential was measured after diluting the polymer emulsion with ion exchanged water based on the sample condition described above, and it was confirmed that the $\zeta$ potential of the particles A was positive (+49 mV).

<Production of Slurry B>

An ion exchanged water slurry of lithium manganate, which was made into fine particles, was obtained by adding 150 g of lithium manganate having an average particle size of 10 µm to 750 g of ion exchanged water and making the mixture into fine particles having an average particle size of 0.5 µm by wet pulverization. A slurry B containing lithium manganate particles (particles B) that are lithium complex oxide particles was obtained by adding 1 part by weight of an anionic surfactant (POIZ 532A, manufactured by Kao Corporation: 40% by weight aqueous solution of a polycarboxylic acid polymer surfactant) relative to 100 parts by weight of the lithium manganate that was made into fine particles to the ion exchanged water slurry, mixing and stirring the mixture, and performing a dispersion treatment on the mixture for 10 minutes using an ultrasonic homogenizer (Ultrasonic Generator; MODEL US-300T, manufactured by NIHONSEIKI KAISHA LTD., probe diameter: 20 mm, V-LEVEL: 400 µA). The $\zeta$ potential was measured after diluting the slurry B with ion exchanged water based on the sample condition described above, and it was confirmed that the $\zeta$ potential of the particles B was negative (−63 mV).

<Production of Slurry C>

A mixture (slurry C) containing lithium complex oxide particles and surface-modified resin particles was produced by placing 180 g of the slurry B (corresponds to 30 g of the solid content) in a 1 L separable flask, adding dropwise a mixture of 24 g of the slurry A (corresponds to 4.8 g of the solid content, 16 parts by weight of the resin particles relative to 100 parts by weight of the lithium complex oxide particles in the slurry B) and 4 g of polyvinyl alcohol having a quaternary ammonium salt group in the side chain (GOHSEFIMER K-210, manufactured by Nippon Synthetic Chemical Industry Co., Ltd.), which was adjusted to a 4% by weight aqueous solution in advance for counterbalancing charges (corresponds to 0.16 g of the solid content, 0.53 parts by weight relative to 100 parts by weight of the lithium complex oxide particles in the slurry B), from a dropping funnel while stirring, increasing the temperature to 80° C., aging at 80° C. for 20 minutes, and cooling to room temperature.

<Aggregation Step>

Aggregates (heterogeneous aggregates) were obtained by removing the solvent with performing reduced pressure drying on the slurry C by a rotational evaporator.

<Firing Step>

Sintered lithium manganate was obtained by placing the above-described aggregates in an alumina crucible and firing the aggregates in an electric furnace (MS electric furnace SLA-2025D, manufactured by Motoyama Co., Ltd., production number MS-0435). After the temperature of the furnace reached 850° C. at an average temperature rising speed of 400° C./hour, the firing was performed at 850° C. for 20 hours while constantly flowing air into the furnace at a flow rate of 5 L/minute. All of the surface-modified resin particles were oxidized and vaporized in the process, and only sintered lithium manganate particles remained in the sintered positive electrode active material.

<Particle Size Adjusting Step>

First, 30 g of the sintered lithium manganate and 300 g of ethanol were mixed, and then the mixture was disintegrated with an ultrasonic homogenizer US-300T (manufactured by NIHONSEIKI KAISHA LTD., rated power 300 W, oscillatory frequency 20 kHz) (irradiation time of ultrasonic waves 5 minutes). Coarse particles were removed by allowing the dispersion after disintegration to pass through an SUS filter of 400 mesh. After that, ethanol was removed by an evaporator, and sintered lithium manganate particles (positive electrode active material particles) having an average particle size of 3.0 µm were obtained.

Example 2

<Production of Slurry A>

First, 50 g of t-butylmethacrylate, 250 g of ion exchanged water, 25 g of a 4% by weight aqueous solution of GOHSEFIMER K-210 manufactured by Nippon Synthetic Chemical Industry Co., Ltd., 0.36 g of EMULGEN 1135S-70 manufactured by Kao Corporation as a nonionic surfactant, and 0.15 g of V-65 manufactured by Wako Pure Chemical Industries, Ltd. as an initiator were mixed. The mixture was emulsified by performing a dispersion treatment on the mixture for 5 minutes using an ultrasonic homogenizer (Ultrasonic Generator; MODEL US-300T, manufactured by NIHONSEIKI KAISHA LTD., probe diameter: 20 mm, V-LEVEL: 400 µA). After that, the total amount of the mixture was placed in a 1 L separable flask, the temperature was increased to 55° C. while stirring under a nitrogen atmosphere, and it was stirred for 3 hours. After that, the temperature was further increased to 65° C., and it was aged for 1.25 hours. After aging, it was cooled to room temperature, and a slurry A was obtained. The average particle size of the resin particles contained in this polymer emulsion was 5.0 µm. The $\zeta$ potential of the particles A was positive (+41 mV).

<Production of Slurry B>

A slurry E was obtained in the same method as in Example 1.

<Production of Slurry C>

A mixture (slurry C) containing lithium complex oxide particles and surface-modified resin particles was produced in the same manner as in Example 1 except the amount of the added surface-modified resin particles was changed to 8 parts by weight relative to 100 parts by weight of the lithium complex oxide particles and the amount of the added 4% by weight aqueous solution of GOHSEFIMER K-210 manufactured by Nippon Synthetic Chemical Industry Co., Ltd. was changed to 2 g (corresponds 0.27 parts by weight of the solid content relative to 100 parts by weight of the lithium complex oxide particles).

Next, an aggregation step and a firing step were performed in the same manner as in Example 1. A photo taken by SEM of the obtained sintered lithium manganate is shown in FIG. 1. Further, sintered lithium manganate particles (positive electrode active material particles) having an average particle size of 5.0 μm were obtained by performing a particle size adjusting step in the same manner as in Example 1 except that the irradiation time of ultrasonic waves to the obtained sintered lithium manganate was made to be 3 minutes.

Example 3

<Production of Slurry A>
A slurry A was obtained in the same method as in Example 2.
<Production of Slurry B>
A slurry B was obtained by adding 150 g of lithium manganate having an average particle size of 1.2 μm to 750 g of ion exchanged water, and further adding 1 part by weight of POIZ 532A (a surfactant manufactured by Kao Corporation) relative to 100 parts by weight of the lithium manganate to this ion exchanged water slurry, mixing and stirring the mixture, and performing a dispersion treatment on the mixture for 10 minutes using an ultrasonic homogenizer (Ultrasonic Generator; MODEL US-300T, manufactured by NIHONSEIKI KAISHA LTD., probe diameter: 20 mm, V-LEVEL: 400 μA) The ζ potential of the particles B was negative (−63 mV).

Next, a slurry C was obtained in the same method as in Example 2, and then an aggregation step and a firing step were performed in the same manner as in Example 1. Next, sintered lithium manganate particles (positive electrode active material particles) having an average particle size of 5.0 μm were obtained by performing a particle size adjusting step in the same manner as in Example 1 except that the irradiation time of ultrasonic waves to the obtained sintered lithium manganate was made to be 3 minutes.

Example 4

<Production of Slurry A>
A slurry A was obtained in the same method as in Example 2.
<Production of Slurry B>
A slurry B was obtained in the same method as in Example 3.

Next, a slurry C was obtained in the same method as in Example 2, and then spray drying (temperature at the introducing part 125° C., temperature at the discharging part 70° C., air flow rate 0.6 m³/minute, spray pressure 110 kPa, spray liquid flow rate 100 mL/minute) was performed using this slurry C (concentration of the solid content 16.4% by weight) with a spray drying apparatus (SD-1000, manufactured by Tokyo Rikakikai Co., Ltd.). Accordingly, aggregates particles containing lithium manganate particles and resin particles having an average particle size of 6.0 μm were obtained.

Next, sintered lithium manganate particles (positive electrode active material particles) of Example 4 were obtained by firing the obtained aggregates particles in the same manner as in Example 1. In Example 4, a particle size adjusting step was not performed.

Example 5

<Production of Slurry A>
A slurry A was obtained in the same method as in Example 1.
<Production of Slurry C>
A slurry C (concentration of the solid content 18.6% by weight) was obtained by adding 100 g of lithium manganate having an average particle size of 1.2 μm and 440 g of ion exchanged water to the slurry A obtained above (corresponds to 8.0 g of the solid content), mixing and stirring the mixture, and performing a dispersion treatment on the mixture for 10 minutes using an ultrasonic homogenizer (Ultrasonic Generator; MODEL US-300T, manufactured by NIHONSEIKI KAISHA LTD., probe diameter: 20 mm, V-LEVEL: 400 μA).

Spray drying (temperature at the introducing part 125° C., temperature at the discharging part 70° C., air flow rate 0.6 m³/minute, spray pressure 110 kPa, spray liquid flow rate 200 mL/hour) was performed using the slurry C with a spray drying apparatus (SD-1000, manufactured by Tokyo Rikakikai Co., Ltd.). Accordingly, aggregates particles containing lithium manganate particles and resin particles having an average particle size of 6.0 μm were obtained. Next, sintered lithium manganate particles (positive electrode active material particles) of Example 5 were obtained by firing the obtained aggregates particles in the same manner as in Example 1. In Example 5, a particle size adjusting step was not performed.

Example 6

<Production of Slurry A>
A dispersion was obtained by mixing 100 g of t-butyl-methacrylate, 300 g of ion exchanged water, 1.5 g of QUARTAMIN 24P manufactured by Kao Corporation as a cationic surfactant, and 0.5 g of V-50 manufactured by Wako Pure Chemical Industries, Ltd. as an initiator and emulsifying the mixture by performing a dispersion treatment on the mixture for 5 minutes using an ultrasonic homogenizer (Ultrasonic Generator; MODEL US-300T, manufactured by NIHON-SEIKI KAISHA LTD., probe diameter: 20 mm, V-LEVEL: 400 μA). Next, 20 g of this dispersion was placed in a 1 L separable flask, and 100 g of ion exchanged water was added thereto. This dispersion was aged by increasing the temperature to 80° C. while stirring under a nitrogen atmosphere, adding the remaining dispersion dropwise from a dropping funnel over 2 hours, and then stirring for 2 hours. After aging, it was cooled to room temperature and a polymer emulsion (slurry A) containing surface-modified resin particles (particles A) was obtained. The average particle size of the resin particles contained in this polymer emulsion was 0.4 μm. Further, the ζ potential was measured after diluting the polymer emulsion with ion exchanged water based on the sample condition described above, and it was confirmed that the ζ potential of the particles A was positive (+75 mV).
<Production of Slurry B>
A slurry B containing lithium complex oxide particles (particles B) was obtained by adding 150 g of lithium manganate having an average particle size of 10 μm to 750 g of ion exchanged water and making the mixture into fine particles having an average particle size of 0.5 μm by wet pulverization. The ζ potential was measured after diluting the slurry B with ion exchanged water based on the sample condition described above, and it was confirmed that the ζ potential of the particles B was negative (−45 mV).
<Production of Slurry C>
A mixture (slurry C) containing lithium complex oxide particles and surface-modified resin particles was produced by placing the slurry B (corresponds to 30 g of the solid content) in a 1 L separable flask, adding the slurry A (corresponds to 4.8 g of the solid content, 16 parts by weight of the resin particles relative to 100 parts by weight of the lithium complex oxide particles in the slurry B) dropwise from a dropping funnel while stirring, increasing the temperature to 80° C., aging at 80° C. for 20 minutes, and cooling to room temperature.

<Aggregation Step>

Aggregates (heterogeneous aggregates) were obtained by removing the solvent with performing reduced pressure drying on the slurry C by a rotational evaporator.

<Firing Step>

Sintered lithium manganate was obtained by placing the above-described aggregates in an alumina crucible and firing the aggregates in an electric furnace (MS electric furnace SLA-2025D, manufactured by Motoyama Co., Ltd., production number MS-0435). After the temperature of the furnace reached 850° C. at an average temperature rising speed of 400° C./hour, the firing was performed at 850° C. for 20 hours while constantly flowing air into the furnace at a flow rate of 5 L/minute. All of the surface-modified resin particles were oxidized and vaporized in the process, and only sintered lithium manganate particles remained in the sintered positive electrode active material.

<Particle Size Adjusting Step>

First, 30 g of the sintered lithium manganate after firing and 300 g of ethanol were mixed, and then the mixture was disintegrated with an ultrasonic homogenizer US-300T (manufactured by NIHONSEIKI KAISHA LTD., rated power 300 W, oscillatory frequency 20 kHz) (irradiation time of ultrasonic waves 5 minutes). Coarse particles were removed by allowing the dispersion after disintegration to pass through an SUS filter of 400 mesh. After that, ethanol was removed by an evaporator, and sintered lithium manganate particles (positive electrode active material particles) having an average particle size of 3.0 μm were obtained.

Comparative Example 1

The measurement of the physical properties and the evaluation of battery characteristics (high-speed discharge characteristics, internal resistance) described above were performed using the lithium manganate particles obtained by making into fine particles in Example 1 as the positive electrode active material particles as they were.

Comparative Example 2

The measurement of the physical properties and the evaluation of battery characteristics (high-speed discharge characteristics, internal resistance) described above were performed using the lithium manganate particles having an average particle size of 1.2 μm as the positive electrode active material particles as they were.

Comparative Example 3

<Production of Slurry A>

A slurry A was obtained by adding 20 g of polymethylmethacrylate particles (MBX8 manufactured by Sekisui Plastics Co., Ltd., average particle size: 8.0 μm) to 80 g of ion exchanged water and then performing a dispersion treatment on the mixture for 5 minutes using an ultrasonic homogenizer (Ultrasonic Generator; MODEL US-300T, manufactured by NIHONSEIKI KAISHA LTD., probe diameter: 20 mm, V-LEVEL: 400 μA). The ζ potential was measured after diluting the slurry A with ion exchanged water based on the sample condition described above, and it was confirmed that the ζ potential of the polymethylmethacrylate particles was negative (−70 mV).

<Production of Slurry B>

A slurry B was obtained in the same method as in Example 3.

<Production of Slurry C>

Next, a slurry C (concentration of the solid content 13.9% by weight) was obtained by adding 30 g of the slurry A (corresponds to 6.0 g of the solid content, 8 parts by weight of the resin particles relative to 100 parts by weight of the lithium complex oxide particles in the slurry B) and 100 g of ion exchanged water to 450 g of the slurry B (corresponds to the solid content of 75 g) and then performing a dispersion treatment on the mixture for 10 minutes using an ultrasonic homogenizer. Spray drying was performed using the slurry C in the same method as in Example 4. Accordingly, aggregates particles containing lithium manganate particles and resin particles having an average particle size of 6.0 μm were obtained.

Next, sintered lithium manganate particles (positive electrode active material particles) of Comparative Example 3 were obtained by firing the obtained aggregates particles in the same manner as in Example 1. In Comparative Example 3, the particle size adjusting step was not performed. The measurement of the physical properties and the evaluation of battery characteristics (high-speed discharge characteristics, internal resistance) described above were performed using the obtained positive electrode active material particles. Moreover, a sub-peak that gives a differential pore volume that is 10% or more of the differential pore volume of the maximum peak pore size did not exist in the side of the pore size that is smaller than the maximum peak pore size in the pore distribution of the positive electrode active material particles of Comparative Example 3.

Example 7

<Production of Slurry A>

First, 9.6 g of polymethylmethacrylate particles from the market (MX-150, manufactured by Soken Chemical & Engineering Co., Ltd.: average particle size 1.5 μm) was added to 32 g of a 4% by weight aqueous solution of GOHSEFIMER K-210 manufactured by Nippon Synthetic Chemical Industry Co., Ltd., which is polyvinyl alcohol having a quaternary ammonium salt group in the side chain, an ultrasonic dispersion treatment was performed for 1 minute, then 168 g of ion exchanged water was added, and the ultrasonic dispersion treatment was performed again for 1 minute. The ζ potential was measured after diluting the obtained polymer emulsion (slurry A) containing surface-modified resin particles (particles A) with ion exchanged water based on the sample condition described above, and it was confirmed that the ζ potential of the particles A was positive (+25 mV).

<Production of Slurry B>

A slurry was prepared by adding 225 g of lithium cobaltate particles (HLC-17, manufactured by Honjo Chemical Corporation) and 22.4 g of a dispersant (POIZ 532A, manufactured by Kao Corporation) to 1270 g of ion exchanged water, and then a pulverization treatment was performed by Ultra Apex Mill UAM-05 manufactured by Kotobuki Industries Co., Ltd. At this time, the media (zirconia) size was made to be 0.1 mm, the media filling rate was made to be 70%, and the circumferential speed was made to be 12 m/s. This pulverization treatment was completed after 90 minutes from the start when it was confirmed that the average particle size reached to 1.5 μm. The ζ potential was measured after diluting the obtained slurry (slurry B) containing lithium complex oxide particles (particles B) with ion exchanged water based on the sample condition described above, and it was confirmed that the ζ potential of the particles B was negative (−67 mV).

<Production of Slurry C>

First, 400 g of the slurry B (corresponds to 59.3 g of lithium cobaltate, 100 parts by weight of lithium cobaltate) was placed in a 1 L flask, a dispersion treatment was performed using an ultrasonic homogenizer while stirring, and at the same time, 209.6 g of the slurry A (resin particles: 16 parts by weight, GOHSEFIMER K-210: 2.2 parts by weight) was gradually added to this slurry B. After that, a dispersion treatment was performed for 10 minutes, and a slurry C (concentration of the solid content 11.5% by weight) was obtained.

<Aggregation Step>

Aggregate particles containing lithium cobaltate particles and resin particles were obtained by performing spray drying (temperature at the introducing part 125° C., temperature at the discharging part 70° C., air flow rate 0.6 m³/minute, spray pressure 110 kPa, spray liquid flow rate 200 mL/hour) using this slurry C with a spray drying apparatus (SD-1000 manufactured by Tokyo Rikakikai Co., Ltd.).

<Firing Step>

Figure 2:
FIG. 2 is a photograph taken by scanning electron microscope (SEM) of sintered lithium complex oxide particles after a firing step is performed in Example 7.

Sintered lithium cobaltate particles (positive electrode active material particles, see FIG. 2) were obtained by placing the above-described aggregates in an alumina crucible and firing in an electric furnace (MS electric furnace SLA-2025D, manufactured by Motoyama Co., Ltd., production number MS-0435). After the temperature of the furnace reached the maximum firing temperature (800° C.) at an average temperature rising speed of 400° C./hour, the firing was performed at 800° C. for 30 hours while constantly flowing air into the furnace at a flow rate of 5 L/minute.

Example 8

<Production of Slurry A>

A slurry A was obtained in the same method as in Example 2.

<Production of Slurry B>

A slurry B was obtained in the same method as in Example 7.

<Production of Slurry C>

First, 400 g of the slurry B (corresponds to 59.3 g of lithium cobaltate, 100 parts by weight of lithium cobaltate) was placed in a 1 L flask, a dispersion treatment was performed using an ultrasonic homogenizer while stirring, and at the same time, 60 g of the slurry A (resin particles: 16 parts by weight, GOHSEFIMER K-210: 0.3 parts by weight) was gradually added to this slurry B. After that, a slurry C (concentration of the solid content 11.4% by weight) was obtained by further adding ion exchanged water to adjust the ion exchanged water to 900 parts by weight relative to 100 parts by weight of lithium cobaltate and then performing a dispersion treatment for 10 minutes.

<Aggregation Step and Firing Step>

Sintered lithium cobaltate particles (positive electrode active material particles) were obtained by performing an aggregation step and a firing step in the same method as in Example 7.

Example 9

Sintered lithium cobaltate particles (positive electrode active material particles) were obtained by performing from the production of the slurry to the firing step in the same method as in Example 7 except that the maximum firing temperature in the firing step was made to be 650° C.

Example 10

<Production of Slurry A>

A slurry A was obtained in the same method as in Example 7.

<Production of Slurry B>

A slurry B was obtained in the same method as in Example 7.

<Production of Slurry C>

First, 400 g of the slurry B (corresponds to 59.3 g of lithium cobaltate, 100 parts by weight of lithium cobaltate) was placed in a 1 L flask, a dispersion treatment was performed using an ultrasonic homogenizer while stirring, and at the same time, 104.8 g of the slurry A (resin particles: 8.1 parts by weight, GOHSEFIMER K-210: 1.1 parts by weight) was gradually added to this slurry B. After that, a slurry C (concentration of the solid content 10.8% by weight) was obtained by further adding ion exchanged water to adjust the ion exchanged water to 900 parts by weight relative to 100 parts by weight of lithium cobaltate and then performing a dispersion treatment for 10 minutes.

<Aggregation Step and Firing Step>

Sintered lithium cobaltate particles (positive electrode active material particles) were obtained by performing an aggregation step and a firing step in the same method as in Example 7.

Example 11

<Production of Slurry A>

First, 19.2 g of polymethylmethacrylate particles from the market (MX-150, manufactured by Soken Chemical & Engineering Co., Ltd.: average particle size 1.5 μm) was added to 64 g of a 4% by weight aqueous solution of GOHSEFIMER K-210, and an ultrasonic dispersion treatment was performed for 1 minute. Next, 126.4 g of ion exchanged water was added, and the ultrasonic dispersion treatment was performed again for 1 minute. The ζ potential was measured after diluting the obtained polymer emulsion (slurry A) with ion exchanged water based on the sample condition described above, and it was confirmed that the ζ potential of the particles A was positive (+25 mV).

<Production of Slurry B>

A slurry B was obtained in the same method as in Example 7.

<Production of Slurry C>

First, 400 g of the slurry B (corresponds to 59.3 g of lithium cobaltate, 100 parts by weight of lithium cobaltate) was placed in a 1 L flask, a dispersion treatment was performed using an ultrasonic homogenizer while stirring, and at the same time, 209.6 g of the slurry A (resin particles: 32 parts by weight, GOHSEFIMER K-210: 4.3 parts by weight) was gradually added to this slurry B. After that, a slurry C (concentration of the solid content 13.1% by weight) was obtained by further adding ion exchanged water to adjust the ion exchanged water to 900 parts by weight relative to 100 parts by weight of lithium cobaltate and then performing a dispersion treatment for 10 minutes.

<Aggregation Step and Firing Step>

Sintered lithium cobaltate particles (positive electrode active material particles) were obtained by performing an aggregation step and a firing step in the same method as in Example 7.

Example 12

Sintered lithium cobaltate particles (positive electrode active material particles) were obtained by performing from the production of the slurry to the firing step in the same method as in Example 7 except that the maximum firing temperature in the firing step was made to be 950° C.

Example 13

<Production of Slurry A>

A slurry A was obtained in the same method as in Example 7.

<Production of Slurry B>

A slurry was prepared by adding 225 g of lithium cobaltate particles (HLC-17, manufactured by Honjo Chemical Corporation) to 1275 g of ethanol, and then a pulverization treatment was performed by Ultra Apex Mill UAM-05 manufactured by Kotobuki Industries Co., Ltd. At this time, the media (zirconia) size was made to be 0.05 mm, the media filling rate was made to be 70%, and the circumferential speed was made to be 10 m/s. This pulverization treatment was completed after 60 minutes from the start when it was confirmed that the average particle size reached to 1.5 µm. Lithium cobaltate particles having an average particle size of 1.5 µm were obtained by removing ethanol from the obtained slurry by an evaporator. A slurry B was obtained by adding 340 g of ion exchanged water to 60 g of the lithium cobaltate particles and then performing a dispersion treatment for 10 minutes using an ultrasonic homogenizer.

<Production of Slurry C>

A slurry C (concentration of the solid content 11.6% by weight) was obtained in the same method as in Example 7.

<Aggregation Step and Firing Step>

Sintered lithium cobaltate particles (positive electrode active material particles) were obtained by performing an aggregation step and a firing step in the same method as in Example 7.

Comparative Example 4

<Production of Slurry C>

A slurry C (concentration of the solid content 10.0% by weight) was obtained by producing a slurry B in the same method as in Example 13 without producing a slurry A, further adding ion exchanged water to adjust the ion exchanged water to be 900 parts by weight relative to 100 parts by weight of lithium cobaltate, and then performing a dispersion treatment for 10 minutes.

<Aggregation Step and Firing Step>

Sintered lithium cobaltate particles (positive electrode active material particles) were obtained by performing an aggregation step and a firing step in the same method as in Example 7.

Comparative Example 5

<Production of Slurry C>

A slurry C (concentration of the solid content 10.0% by weight) was obtained by producing a slurry B in the same method as in Example 7 without producing a slurry A, further adding ion exchanged water to adjust the ion exchanged water to be 900 parts by weight relative to 100 parts by weight of lithium cobaltate, and then performing a dispersion treatment for 10 minutes.

<Aggregation Step and Firing Step>

Figure 3:
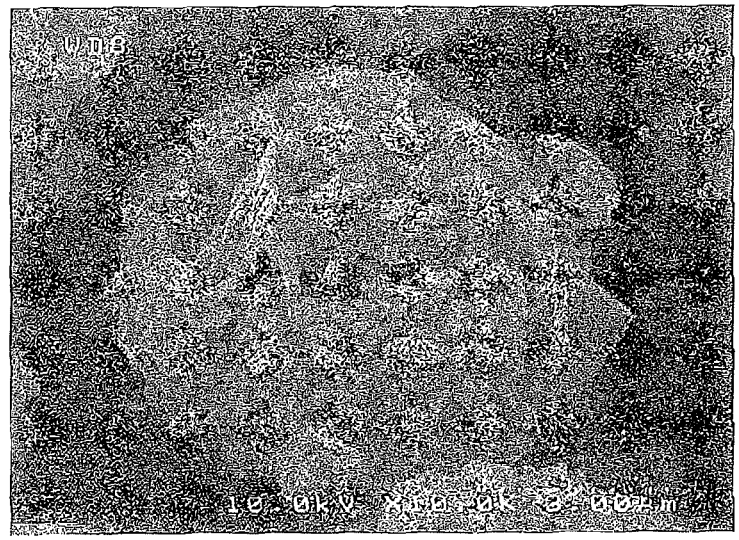
FIG. 3 is a photograph taken by scanning electron microscope (SEM) of sintered lithium complex oxide particles after a firing step is performed in Comparative Example 5.

Sintered lithium cobaltate particles (positive electrode active material particles, see FIG. 3) were obtained by performing an aggregation step and a firing step in the same method as in Example 7.

Example 14

<Production of Slurry A>

A slurry A was obtained in the same method as in Example 7.

<Production of Slurry B>

A slurry was prepared by adding 225 g of lithium nickelate particles (manufactured by Honjo Chemical Corporation, average particle size 10 µm) and 22.4 g of a dispersant (POIZ 532A) to 1270 g of ion exchanged water, and then a pulverization treatment was performed by Ultra Apex Mill UAM-05 manufactured by Kotobuki Industries Co., Ltd. At this time, the media (zirconia) size was made to be 0.1 mm, the media filling rate was made to be 70%, and the circumferential speed was made to be 8 m/s. This pulverization treatment was completed after 30 minutes from the start when it was confirmed that the average particle size reached to 1.5 µm. The ζ potential was measured after diluting the obtained slurry (slurry B) with ion exchanged water based on the sample condition described above, and it was confirmed that the ζ potential of the particles B was negative (−60 mV).

<Production of Slurry C>

First, 400 g of the slurry B (corresponds to 59.3 g of lithium nickelate, 100 parts by weight of lithium nickelate) was placed in a 1 L flask, a dispersion treatment was performed using an ultrasonic homogenizer while stirring, and at the same time, 209.6 g of the slurry A (resin particles: 16 parts by weight, GOHSEFIMER K-210: 2.2 parts by weight) was gradually added to this slurry B. After that, a dispersion treatment was performed for 10 minutes, and a slurry C (concentration of the solid content 11.5% by weight) was obtained.

<Aggregation Step and Firing Step>

Sintered lithium nickelate particles (positive electrode active material particles) were obtained by performing an aggregation step and a firing step in the same method as in Example 7 except that the maximum firing temperature in the firing step was made to be 700° C.

The measurement of the physical properties and the evaluation of battery characteristics (high-speed discharge characteristics, internal resistance) described above were performed using the positive electrode active material particles of Examples 1 to 14 and Comparative Examples 1 to 5. The conditions, etc. of the production process are shown in Table 2, and the evaluation results are shown in Table 3.

TABLE 2

| | SLURRY A | | | | | | SLURRY B | SLURRY B | | SLURRY C | | |
|---|---|---|---|---|---|---|---|---|---|---|---|---|
| | SURFACE-MODIFIED RESIN PARTICLES (PARTICLES A) | | | | | | | LITHIUM COMPLEX OXIDE PARTICLES (PARTICLES B) | | | | |
| | | RESIN PARTICLES | | | | | | | | | | |
| | SOLVENT | TYPE | AVERAGE PARTICLE SIZE (μm) | CATIONIC SURFACTANT | ζ POTENTIAL mV | SLURRY B SOLVENT | COMPOSITION | AVERAGE PARTICLE SIZE μm | ζ POTENTIAL mV | ION EXCHANGED WATER PARTS BY WEIGHT | WEIGHT OF PARTICLES A PARTS BY WEIGHT | WEIGHT OF PARTICLES B PARTS BY WEIGHT |
| Example 1 | ION EXCHANGED WATER | PBMA | 0.5 | QUARTAMIN 24P | +49 | ION EXCHANGED WATER | LITHIUM MANGANATE | 0.5 | −63 | 577 | 16.0 | 100 |
| Example 2 | ION EXCHANGED WATER | PBMA | 5.0 | K-210 | +41 | ION EXCHANGED WATER | LITHIUM MANGANATE | 0.5 | −63 | 551 | 8.0 | 100 |
| Example 3 | ION EXCHANGED WATER | PBMA | 5.0 | K-210 | +41 | ION EXCHANGED WATER | LITHIUM MANGANATE | 1.2 | −63 | 551 | 8.0 | 100 |
| Example 4 | ION EXCHANGED WATER | PBMA | 5.0 | K-210 | +41 | ION EXCHANGED WATER | LITHIUM MANGANATE | 1.2 | −63 | 551 | 8.0 | 100 |
| Example 5 | ION EXCHANGED WATER | PBMA | 0.5 | QUARTAMIN 24P | +49 | — | LITHIUM MANGANATE | 1.2 | — | 472 | 8.0 | 100 |
| Example 6 | ION EXCHANGED WATER | PBMA | 0.4 | QUARTAMIN 24P | +75 | ION EXCHANGED WATER | LITHIUM MANGANATE | 0.5 | −45 | 564 | 16.0 | 100 |
| Comparative Example 1 | — | — | — | — | — | — | LITHIUM MANGANATE | 0.5 | — | — | — | — |
| Comparative Example 2 | — | — | — | — | — | — | LITHIUM MANGANATE | 1.2 | — | — | — | — |
| Comparative Example 3 | ION EXCHANGED WATER | MBX8 | 8.0 | NONE | −70 | ION EXCHANGED WATER | LITHIUM MANGANATE | 1.2 | −63 | 666 | 8.0 | 100 |
| Example 7 | ION EXCHANGED WATER | MX-150 | 1.5 | K-210 | +25 | ION EXCHANGED WATER | | | | | | |
| Example 8 | ION EXCHANGED WATER | PBMA | 5.0 | K-210 | +41 | ION EXCHANGED WATER | | | | | | |
| Example 9 | ION EXCHANGED WATER | MX-150 | 1.5 | K-210 | +25 | ION EXCHANGED WATER | | | | | | |
| Example 10 | ION EXCHANGED WATER | MX-150 | 1.5 | K-210 | +25 | ION EXCHANGED WATER | | | | | | |
| Example 11 | ION EXCHANGED WATER | MX-150 | 1.5 | K-210 | +25 | ION EXCHANGED WATER | | | | | | |
| Example 12 | ION EXCHANGED WATER | MX-150 | 1.5 | K-210 | +25 | ION EXCHANGED WATER | | | | | | |
| Example 13 | ION EXCHANGED WATER | MX-150 | 1.5 | K-210 | +25 | ION EXCHANGED WATER | | | | | | |
| Comparative Example 4 | — | — | — | — | — | ION EXCHANGED WATER | | | | | | |
| Comparative Example 5 | — | — | — | — | — | ION EXCHANGED WATER | | | | | | |
| Example 14 | ION EXCHANGED WATER | MX-150 | 1.5 | K-210 | +25 | ION EXCHANGED WATER | | | | | | |

TABLE 2-continued

| | | | | | | |
|---|---|---|---|---|---|---|
| Example 3 | MANGANATE | | | | | |
| Example 7 | LITHIUM COBALTATE | 1.5 | −67 | 905 | 16.0 | 100 |
| Example 8 | LITHIUM COBALTATE | 1.5 | −67 | 900 | 16.0 | 100 |
| Example 9 | LITHIUM COBALTATE | 1.5 | −67 | 905 | 16.0 | 100 |
| Example 10 | LITHIUM COBALTATE | 1.5 | −67 | 900 | 8.1 | 100 |
| Example 11 | LITHIUM COBALTATE | 1.5 | −67 | 900 | 32.0 | 100 |
| Example 12 | LITHIUM COBALTATE | 1.5 | −67 | 905 | 16.0 | 100 |
| Example 13 | LITHIUM COBALTATE | 1.5 | −40 | 898 | 16.0 | 100 |
| Comparative Example 4 | LITHIUM COBALTATE | 1.5 | −40 | 900 | — | 100 |
| Comparative Example 5 | LITHIUM COBALTATE | 1.5 | −67 | 900 | — | 100 |
| Example 14 | LITHIUM NICKELATE | 1.5 | −60 | 905 | 16.0 | 100 |

| | | FIRING STEP | | PARTICLE SIZE ADJUSTING STEP | |
|---|---|---|---|---|---|
| | AGGREGATION STEP (AGGREGATION METHOD) | MAXIMUM FIRING TEMPERATURE °C. | FIRING TIME HOUR | METHOD | AVERAGE PARTICLE SIZE OF POSITIVE ELECTRODE ACTIVE MATERIAL PARTICLES μm |
| Example 1 | REDUCED PRESSURE DRYING | 850 | 20 | ULTRASONIC WAVES | 3.0 |
| Example 2 | REDUCED PRESSURE DRYING | 850 | 20 | ULTRASONIC WAVES | 5.0 |
| Example 3 | REDUCED PRESSURE DRYING | 850 | 20 | ULTRASONIC WAVES | 5.0 |
| Example 4 | SPRAY DRYING | 850 | 20 | NONE | 6.0 |
| Example 5 | SPRAY DRYING | 850 | 20 | NONE | 6.0 |
| Example 6 | REDUCED PRESSURE DRYING | 850 | 20 | ULTRASONIC WAVES | 3.0 |
| Comparative Example 1 | — | — | — | NONE | 0.5 |
| Comparative Example 2 | — | — | — | NONE | 1.2 |
| Comparative Example 3 | SPRAY DRYING | 850 | 20 | NONE | 6.0 |
| Example 7 | SPRAY DRYING | 800 | 30 | NONE | 6.7 |
| Example 8 | SPRAY DRYING | 800 | 30 | NONE | 6.5 |
| Example 9 | SPRAY DRYING | 650 | 30 | NONE | 6.1 |
| Example 10 | SPRAY DRYING | 800 | 30 | NONE | 5.0 |
| Example 11 | SPRAY DRYING | 800 | 30 | NONE | 5.2 |
| Example 12 | SPRAY DRYING | 950 | 30 | NONE | 6.1 |
| Example 13 | SPRAY DRYING | 800 | 30 | NONE | 5.8 |
| Comparative Example 4 | SPRAY DRYING | 800 | 30 | NONE | 5.0 |
| Comparative Example 5 | SPRAY DRYING | 800 | 30 | NONE | 5.0 |
| Example 14 | SPRAY DRYING | 700 | 30 | NONE | 6.0 |

PBMA: polymer particles of t-butylmethacrylate
MBX8: polymethylmethacrylate particles manufactured by Sekisui Plastics Co., Ltd. (average particle size 8.0 μm)
MX-150: polymethylmethacrylate particles manufactured by Soken Chemical & Engineering Co., Ltd. (average particle size 1.5 μm)
QUARTAMIN 24P: cationic surfactant manufactured by Kao Corporation (27% by weight aqueous solution of lauryltrimethyl ammonium salt)
K-210: polyvinyl alcohol derivative manufactured by Nippon Synthetic Chemical Industry Co., Ltd. (polyvinyl alcohol having a quaternary ammonium salt group in the side chain)

TABLE 3

| | PHYSICAL PROPERTIES OF POSITIVE ELECTRODE ACTIVE MATERIAL PARTICLES | | |
|---|---|---|---|
| | FORM OF PARTICLES | X-RAY DIFFRACTION HALF-VALUE WIDTH (deg) | TOTAL PORE VOLUME (mL/g) |
| Example 1 | NON-SPHERICAL SECONDARY PARTICLES IN WHICH PRELIMINARY PARTICLES ARE SINTERED | 0.13 | 0.65 |

TABLE 3-continued

| | | | |
|---|---|---|---|
| Example 2 | NON-SPHERICAL SECONDARY PARTICLES IN WHICH PRELIMINARY PARTICLES ARE SINTERED | 0.13 | 0.48 |
| Example 3 | NON-SPHERICAL SECONDARY PARTICLES IN WHICH PRELIMINARY PARTICLES ARE SINTERED | 0.13 | 0.50 |
| Example 4 | SPHERICAL SECONDARY PARTICLES IN WHICH PRELIMINARY PARTICLES ARE SINTERED | 0.13 | 0.74 |
| Example 5 | SPHERICAL SECONDARY PARTICLES IN WHICH PRELIMINARY PARTICLES ARE SINTERED | 0.13 | 0.65 |
| Example 6 | NON-SPHERICAL SECONDARY PARTICLES IN WHICH PRELIMINARY PARTICLES ARE SINTERED | 0.13 | 0.60 |
| Comparative Example 1 | INDEPENDENT PRELIMINARY PARTICLES | 0.35 | 0.32 |
| Comparative Example 2 | INDEPENDENT PRELIMINARY PARTICLES | 0.18 | 0.35 |
| Comparative Example 3 | SPHERICAL SECONDARY PARTICLES IN WHICH PRELIMINARY PARTICLES ARE SINTERED | 0.18 | 0.50 |
| Example 7 | SPHERICAL SECONDARY PARTICLES IN WHICH PRELIMINARY PARTICLES ARE SINTERED | 0.20 | 0.78 |
| Example 8 | SPHERICAL SECONDARY PARTICLES IN WHICH PRELIMINARY PARTICLES ARE SINTERED | 0.20 | 0.74 |
| Example 9 | SPHERICAL SECONDARY PARTICLES IN WHICH PRELIMINARY PARTICLES ARE SINTERED | 0.25 | 0.72 |
| Example 10 | SPHERICAL SECONDARY PARTICLES IN WHICH PRELIMINARY PARTICLES ARE SINTERED | 0.20 | 0.56 |
| Example 11 | SPHERICAL SECONDARY PARTICLES IN WHICH PRELIMINARY PARTICLES ARE SINTERED | 0.22 | 0.88 |
| Example 12 | SPHERICAL SECONDARY PARTICLES IN WHICH PRELIMINARY PARTICLES ARE SINTERED | 0.16 | 0.16 |
| Example 13 | SPHERICAL SECONDARY PARTICLES IN WHICH PRELIMINARY PARTICLES ARE SINTERED | 0.20 | 0.54 |
| Comparative Example 4 | SPHERICAL SECONDARY PARTICLES IN WHICH PRELIMINARY PARTICLES ARE SINTERED | 0.18 | 0.49 |
| Comparative Example 5 | SPHERICAL SECONDARY PARTICLES IN WHICH PRELIMINARY PARTICLES ARE SINTERED | 0.18 | 0.40 |
| Example 14 | SPHERICAL SECONDARY PARTICLES IN WHICH PRELIMINARY PARTICLES ARE SINTERED | 0.22 | 0.62 |

| | PHYSICAL PROPERTIES OF POSITIVE ELECTRODE ACTIVE MATERIAL PARTICLES | | | EVALUATION OF POSITIVE ELECTRODE COMPOSITION | |
|---|---|---|---|---|---|
| | PEAK PORE SIZE | | | | |
| | MAXIMUM PEAK PORE SIZE (μm) | SUB-PEAK PORE SIZE (μm) | BET SPECIFIC SURFACE AREA ($m^2/g$) | BATTERY CHARACTERISTICS | |
| | | | | HIGH-SPEED DISCHARGE CHARACTERISTICS (%) | INTERNAL RESISTANCE (Ω) |
| Example 1 | 0.41 | NONE | 3.2 | 75 | 9.0 |
| Example 2 | 0.42 | NONE | 2.9 | 80 | 8.5 |
| Example 3 | 1.44 | NONE | 1.7 | 82 | 8.4 |
| Example 4 | 2.48 | 0.70 | 2.1 | 90 | 7.3 |
| Example 5 | 2.50 | 0.52 | 2.0 | 82 | 8.3 |
| Example 6 | 0.40 | NONE | 3.0 | 73 | 8.9 |
| Comparative Example 1 | 0.12 | NONE | 10.1 | 40 | 12.0 |
| Comparative Example 2 | 0.50 | NONE | 4.5 | 60 | 10.0 |
| Comparative Example 3 | 2.50 | NONE | 1.9 | 63 | 9.7 |
| Example 7 | 1.64 | 1.02 | 1.8 | 90 | 6.8 |
| Example 8 | 2.07 | 1.29 | 1.9 | 92 | 6.9 |
| Example 9 | 1.84 | 0.84 | 1.6 | 75 | 7.6 |
| Example 10 | 2.53 | 1.53 | 1.5 | 90 | 7.0 |
| Example 11 | 1.63 | 1.11 | 2.1 | 80 | 7.3 |
| Example 12 | 2.90 | 1.84 | 1.1 | 75 | 7.5 |
| Example 13 | 2.53 | 1.53 | 1.3 | 75 | 7.6 |
| Comparative Example 4 | 1.41 | 0.39 | 1.0 | 60 | 8.6 |
| Comparative Example 5 | 2.38 | NONE | 0.8 | 55 | 8.9 |
| Example 14 | 2.25 | 1.38 | 2.2 | 75 | 9.0 |

As shown in the results in Table 3, the results of favorable high-speed discharge characteristics and internal resistance were obtained in Examples 1 to 14 compared to those in Comparative Examples 1 to 5.

The invention claimed is:

1. A process of producing positive electrode active material particles for a battery, comprising a step of providing a slurry comprising resin particles, a cationic surfactant and/or a polyvinyl alcohol derivative, lithium complex oxide particles, and a polar solvent; removing the polar solvent from the slurry to give a composition; and firing the composition and at the same time, removing the resin particles from the composition, wherein the cationic surfactant is a quaternary ammonium salt, the polyvinyl alcohol derivative is a polyvinyl alcohol into which a quaternary ammonium salt group has been introduced or which has been substituted by a quaternary ammonium salt group, and the resin particles have an average particle size of 0.1 to 20μm;

wherein the process further comprises:

Step 1 of providing the resin particles obtained by emulsion polymerization or suspension polymerization of an ethylenically unsaturated monomer in the presence of the cationic surfactant and/or the polyvinyl alcohol derivative in a polar solvent 1 and preparing a slurry A containing the resin particles, the cationic surfactant and/or the polyvinyl alcohol derivative, and the polar solvent 1, Step 2 of obtaining a slurry C by mixing the lithium complex oxide particles and the slurry A or by mixing a slurry B containing the lithium complex oxide particles and a polar solvent 2 and the slurry A, Step 3 of obtaining a composition containing the resin particles, the cationic surfactant and/or the polyvinyl alcohol derivative, and the lithium complex oxide particles by removing the polar solvent 1 or the polar solvents 1 and 2 from the slurry C, and Step 4 of obtaining a sintered lithium complex oxide by firing the composition and at the same time, removing the resin particles from the composition, wherein the slurry A practically comprises the resin particles, the cationic surfactant and/or the polyvinyl alcohol derivative, and the polar solvent 1, the slurry B practically comprises the lithium complex oxide particles and the polar solvent 2, and the slurry C practically comprises the slurry A and the lithium complex oxide particles or the slurry B.

2. The process for producing positive electrode active material particles for a battery according to claim 1, wherein the emulsion polymerization or the suspension polymerization of the ethylenically unsaturated monomer is performed in the presence of a nonionic surfactant in Step 1.

3. The process for producing positive electrode active material particles for a battery according to claim 1, wherein the ethylenically unsaturated monomer is at least one type selected from the group consisting of acrylic acid, methacrylic acid, and an ester thereof.

4. The process for producing positive electrode active material particles for a battery according to claim 1, wherein the composition is fired and at the same time, the resin particles and the cationic surfactant and/or the polyvinyl alcohol derivative are removed from the composition by thermal decomposition in Step 4.

5. A process for producing a positive electrode composition for a battery containing positive electrode active material particles for a battery and a conductive material, wherein the positive electrode active material particles for a battery are positive electrode active material particles for a battery, which are obtained with the production process according to claim 1.

6. The process for producing a positive electrode composition for a battery according to claim 5, comprising a step of adjusting the average particle size of the positive electrode active material particles for a battery to 0.8 to 15 times the average particle size of resin particles in a slurry that is used when producing the positive electrode active material particles for a battery.

* * * * *